US012332911B1

(12) United States Patent
Drillock et al.

(10) Patent No.: US 12,332,911 B1
(45) Date of Patent: Jun. 17, 2025

(54) AUTOMATIC INTAKE AND PROCESSING SYSTEM AND METHOD

(71) Applicant: ClearDox LLC, Stamford, CT (US)

(72) Inventors: Greg Drillock, Pleasantville, NY (US); Marc Lefebvre, Southport, CT (US)

(73) Assignee: ClearDox LLC, Stamford, CT (US)

( * ) Notice: Subject to any disclaimer, the term of this patent is extended or adjusted under 35 U.S.C. 154(b) by 0 days.

(21) Appl. No.: 18/297,992

(22) Filed: Apr. 10, 2023

Related U.S. Application Data

(60) Provisional application No. 63/330,534, filed on Apr. 13, 2022.

(51) Int. Cl.
| | |
|---|---|
| *G06F 3/048* | (2013.01) |
| *G06F 16/25* | (2019.01) |
| *G06F 40/151* | (2020.01) |
| *G06F 40/205* | (2020.01) |
| *G06F 40/295* | (2020.01) |

(52) U.S. Cl.
CPC .......... *G06F 16/258* (2019.01); *G06F 40/151* (2020.01); *G06F 40/205* (2020.01); *G06F 40/295* (2020.01)

(58) Field of Classification Search
CPC .... G06F 16/258; G06F 40/205; G06F 40/295; G06F 40/151
See application file for complete search history.

(56) References Cited

U.S. PATENT DOCUMENTS

| | | | | |
|---|---|---|---|---|
| 6,466,935 | B1 * | 10/2002 | Stuart | G06Q 10/06 |
| 7,111,075 | B2 * | 9/2006 | Pankovcin | G06F 16/258 |
| | | | | 709/213 |
| 8,397,161 | B1 * | 3/2013 | Shah | G06F 16/958 |
| | | | | 715/239 |
| 10,362,133 | B1 * | 7/2019 | Maag | G06Q 10/10 |
| 12,072,843 | B1 * | 8/2024 | Jain | G06F 16/174 |
| 2003/0140311 | A1 * | 7/2003 | Lemon | G06F 16/30 |
| | | | | 715/239 |
| 2006/0101058 | A1 * | 5/2006 | Chidlovskii | G06F 40/154 |
| | | | | 707/999.102 |
| 2007/0100920 | A1 * | 5/2007 | Funnekotter | H04L 69/22 |
| | | | | 715/239 |

(Continued)

OTHER PUBLICATIONS

Skluzacek et al., Skluma: An extensible metadata extraction pipeline for disorganized data, 2018, IEEE, 11 pages. (Year: 2018).*

*Primary Examiner* — Linh K Pham
(74) *Attorney, Agent, or Firm* — Leason Ellis LLP

(57) ABSTRACT

Document transformation and processing are provided. An electronic file is provided in a first format and processed to convert the electronic file to a second format. Information in at least one database is referenced for selecting for at least some content in the electronic file, a respective one of a plurality of parsing pipelines. Each of the parsing pipelines can include processing instructions for one or more of content extraction, entity recognition, and schema mapping. The respective one of the plurality of parsing pipelines can be applied to content in the electronic file. Moreover, entity recognition can be applied on the extracted content and, in response, output received. Still further, the output can be mapped to a respective one of a plurality of schemas and provided in a graphical user interface.

20 Claims, 18 Drawing Sheets

(56) References Cited

U.S. PATENT DOCUMENTS

| | | | |
|---|---|---|---|
| 2007/0294614 A1* | 12/2007 | Jacquin | G06F 40/169 |
| | | | 707/E17.093 |
| 2008/0017722 A1* | 1/2008 | Snyder | G06Q 10/00 |
| | | | 235/494 |
| 2009/0280844 A1* | 11/2009 | Norton | H04L 65/765 |
| | | | 455/466 |
| 2013/0188875 A1* | 7/2013 | Sesum | G06V 30/416 |
| | | | 382/198 |
| 2018/0322138 A1* | 11/2018 | Chang | H04N 1/4486 |

* cited by examiner

AUTOMATIC INTAKE AND PROCESSING SYSTEM AND METHOD

CROSS-REFERENCE TO RELATED APPLICATION(S)

The present patent application is based on and claims priority to U.S. Provisional Patent Application Ser. No. 63/330,534, filed Apr. 13, 2022, which is incorporated by reference as if expressly set forth in its entirety herein.

FIELD

The present application relates, generally, to automatic document processing and, more particularly, to a system and method for improving document ingestion, recognition and usability, including as a function of machine learning and artificial intelligence.

BACKGROUND

Information exchange occurs across many technologies, including email, file transfer protocol, application programming interfaces, and others. Processing large documents and large volumes of documents, such as invoices, purchase orders, inventory spreadsheets, charts, receipts, or multitudes of other types business documents continues to be technologically challenging, time-consuming, and expensive.

At least in part, challenges associated with receiving, intaking, and ingesting electronic documents can be due to a tremendous variety in file formats, document structures, and contents, as well as how such variety is handled by a variety of recipients. In response, individual recipients develop respective procedures for document reception and processing, resulting in duplicative and inconsistent efforts.

It is with respect to these and other considerations that the disclosure made herein is presented.

BRIEF SUMMARY

In one or more implementations of the present disclosure, a document transformation and processing system and method are provided. At least one processor can be configured to access an electronic file provided in a first format. Thereafter, the at least one processor can process the electronic file to convert the electronic file to a second format. The at least one processor can select, by referencing information in at least one database associated with at least some content in the electronic file, a respective one of a plurality of parsing pipelines. Each of the parsing pipelines can include processing instructions for one or more of content extraction, entity recognition, and schema mapping. In addition, the at least one processor can apply the respective one of the plurality of parsing pipelines to the at least some content in the electronic file. For example, the one of the plurality of parsing pipelines can be applied by the at least one processor by extracting content in the electronic file. Moreover, the at least one processor can apply entity recognition on the extracted content and receive, in response to the entity recognition, output. Still further, the at least one processor can be configured to map the output to a respective one of a plurality of schemas, and present, in a graphical user interface, the mapped content and the respective one of the plurality of schemas.

In one or more implementations of the present disclosure, mapping the output further comprises converting the output to a third format, wherein the third format is compliant for mapping in the respective one of the plurality of schemas.

In one or more implementations of the present disclosure, selecting, by the at least one processor, the respective one of a plurality of parsing pipelines is in accordance with metadata provided with the electronic file, content in the electronic file associated with a respective parsing pipeline, or entity recognition.

In one or more implementations of the present disclosure, identifying the content includes recognizing, by the at least one processor, at least one anchor term included in the electronic file.

In one or more implementations of the present disclosure, the at least one processor is further configured to identify a plurality of documents in the electronic file, and to split the electronic file into the plurality of documents.

In one or more implementations of the present disclosure, the at least one processor is further configured to segment at least one of the plurality of documents into at least one of a section group, a section, and a subsection. Applying entity recognition by the at least one processor can include applying entity recognition on the at least one of the section group, the section, and the subsection.

Other features of the present disclosure are shown and described herein.

BRIEF DESCRIPTION OF THE DRAWINGS

Aspects of the present disclosure will be more readily appreciated upon review of the detailed description of its various implementations, described below, when taken in conjunction with the accompanying drawings, of which:

FIG. 16 illustrates an example display screen that is provided, in connection with splitting, in accordance with an example implementation of the present disclosure.

DESCRIPTION

Figure 1:
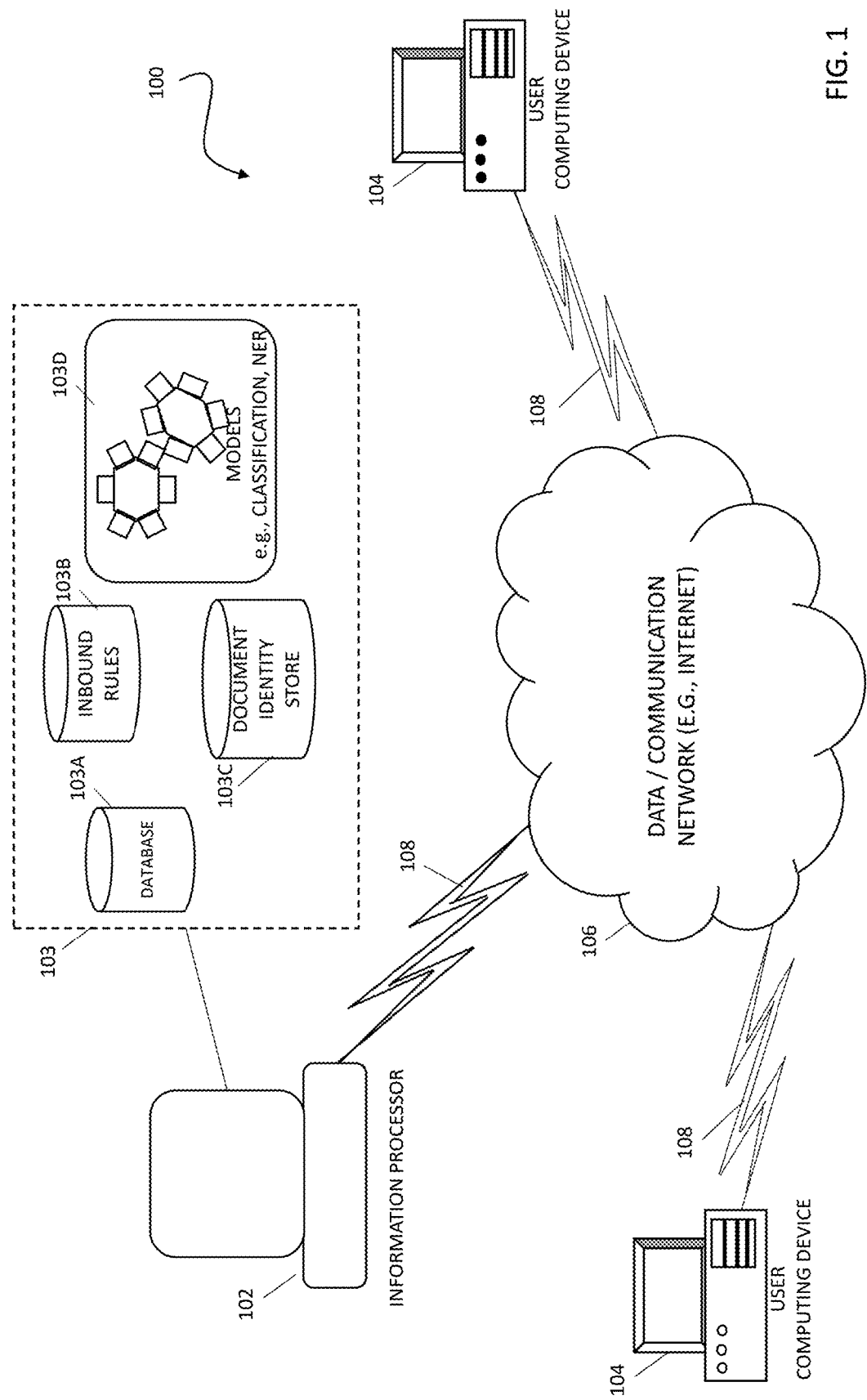
FIG. 1 is a diagram illustrating an example hardware arrangement that operates for providing the systems and methods disclosed herein.

By way of overview and introduction, the present disclosure provides systems and methods for electronic document intake and processing. Documents received, for example, from various external counterparties, such as vendors and customers of vendors can be processed in accordance with the teachings herein, including via artificial intelligence, machine learning, and natural language processing technologies for automating data identification, extraction, and reconciliation. Documents can be received, such as attachments in email, via file transfer protocol ("FTP"), screen scraping, or other suitable ways for processing to identify, extract, and generate data therefrom.

The present disclosure provides technological improvements directed to the functioning of computing devices, including in terms of efficiency and accuracy. This can be accomplished at least partly by implementing automatic processes on received files, such as to split a file into multiple documents and to segment document(s) into logical sections for further processing. Content in a document can be extracted, including via one or more machine learning and artificial intelligence applications, and ones of a plurality of models, such as a classification model and a named entity recognition ("NER") model, can be applied on the extracted content. Thus, the document workflow of the present disclosure can include one or more computing devices configured by executing instructions to perform processing steps including for document importation, segmentation, extraction, enrichment, and mapping data for further downstream processes.

Information associated with received documents can include categories of documents, identifiers of documents, origination of documents, as well as when/how documents were received. Documents can be provided in a variety of formats (e.g., MS-EXCEL, MS-WORD, ADOBE PDF, or various other formats), and can include invoices, receipts, inventory reports, charts, or virtually any other business documents. Documents can be categorized (after being processed) or uncategorized (when pre-processed or due to difficulties during processing) and, thereafter, grouped. Documents can be automatically received and recognized based on internal rules and further processed for data extraction, validation, and normalization to represent the data in accordance with one or more data schemas. The output of the data is configurable, in which users can define respective data schemas, as well as how and where data are stored. In one or more implementations, data schemas can be predefined and, thereafter, altered and customized by users.

Aspects of the present disclosure can be provided as software as a service ("SAS") in which users, such as representatives or employees of a company, can access respective data that are available for inspection and use via at least one graphical user interface ("GUI"). A company can subscribe to a proprietor of the present disclosure for secured and restricted access to a GUI and/or data respectively associated with the user. Data can be provided via the GUI, and selections and operations made by a user via the GUI can define data and storage thereof, in accordance with a respective schema. One or more graphical user interfaces can be provided for a variety of computing devices, such as desktop computers, laptop computers, tablet computers, smartphones, or other suitable processing device.

Referring to FIG. 1, a diagram is provided that shows an example hardware arrangement that operates for providing the systems and methods disclosed herein, and designated generally as system 100. System 100 can include one or more information processors 102 that are at least communicatively coupled to one or more user computing devices 104 across communication network 106. Information processors 102 and user computing devices 104 can include, for example, mobile computing devices such as tablet computing devices, smartphones, personal digital assistants or the like, as well as laptop computers and/or desktop computers, server computers and mainframe computers. Further, one computing device may be configured as an information processor 102 or a user computing device 104, depending upon operations being executed at a particular time.

With continued reference to FIG. 1, information processor 102 can be configured to access one or more databases 103 for the present disclosure, including databases 103A, inbound rules 103B, document identity store 103C, and models 103D (such as a classification model and a named entity recognition model). It is contemplated that information processor 102 can access any required databases via communication network 106 or any other communication network to which information processor 102 has access. Information processor 102 can communicate with devices comprising databases using any known communication method, including a direct serial, parallel, universal serial bus ("USB") interface, or via a local or wide area network.

User computing devices 104 can communicate with information processors 102 using data connections 108, which are respectively coupled to communication network 106. Communication network 106 can be any communication network, but typically is or includes the Internet or other computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other means, to provide received data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and information processors 102.

System 100 preferably includes software that provides functionality described in greater detail herein, and preferably resides on one or more information processors 102 and/or user computing devices 104. One of the functions performed by information processor 102 can be that of operating as a web server and/or a web site host. Information processors 102 typically communicate with communication network 106 across a permanent i.e., un-switched data connection 108. Permanent connectivity ensures that access to information processors 102 is always available.

Figure 2:
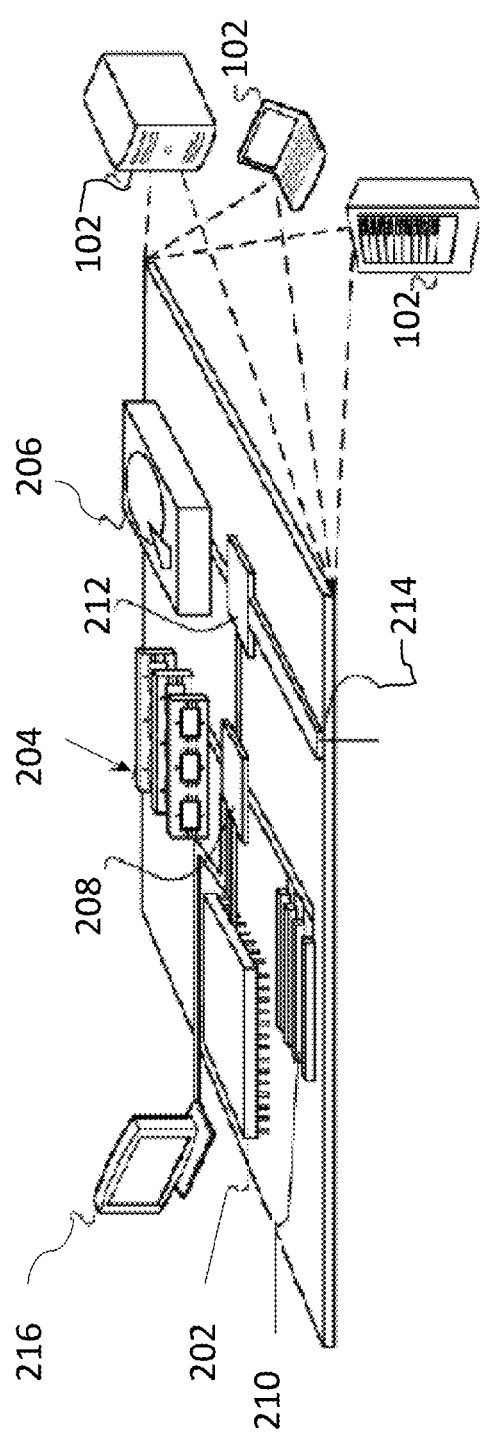
FIG. 2 is a block diagram that illustrates functional elements of a computing device, in accordance with an implementation of the present disclosure.

FIG. 2 shows an example information processor 102 that can be used to implement the techniques described herein. The information processor 102 is intended to represent various forms of digital computers, such as laptops, desktops, workstations, personal digital assistants, servers, blade servers, mainframes, and other appropriate computers. The components shown in FIG. 2, including connections and relationships, and their functions, are meant to be exemplary only, and are not meant to limit implementations of the inventions described and/or claimed in this document.

The information processor 102 includes a processor 202, a memory 204, a storage device 206, a high-speed interface 208 connecting to the memory 204 and multiple high-speed expansion ports 210, and a low-speed interface 212 connecting to a low-speed expansion port 214 and the storage device 206. Each of the processor 202, the memory 204, the storage device 206, the high-speed interface 208, the high-speed expansion ports 210, and the low-speed interface 212, are interconnected using various busses, and can be mounted on a common motherboard or in other manners as appropriate. The processor 202 can process instructions for execution within the information processor 102, including instructions stored in the memory 204 or on the storage device 206 to display graphical information for a GUI on an external input/output device, such as a display 216 coupled to the high-speed interface 208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 204 stores information within the information processor 102. In some implementations, the memory 204 is a volatile memory unit or units. In some implementations, the memory 204 is a non-volatile memory unit or units. The memory 204 can also be another form of computer-readable medium, such as a magnetic or optical disk.

The storage device 206 is capable of providing mass storage for the information processor 102. In some implementations, the storage device 206 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 204, the storage device 206, or memory on the processor 202.

The high-speed interface 208 can be configured to manage bandwidth-intensive operations, while the low-speed interface 212 can be configured to manage lower bandwidth-intensive operations. Of course, one of ordinary skill in the art will recognize that such allocation of functions is exemplary only. In some implementations, the high-speed interface 208 is coupled to the memory 204, the display 216 (e.g., through a graphics processor or accelerator), and to the high-speed expansion ports 210, which can accept various expansion cards (not shown). In an implementation, the low-speed interface 212 is coupled to the storage device 206 and the low-speed expansion port 214. The low-speed expansion port 214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, the information processor 102 can be implemented in a number of different forms. For example, it can be implemented as a standard server, or multiple times in a group of such servers. In addition, it can be implemented in a personal computer such as a laptop computer. It can also be implemented as part of a rack server system. Alternatively, components from a computing device can be combined with other components in a mobile device (not shown), such as a mobile computing device.

Figure 3:
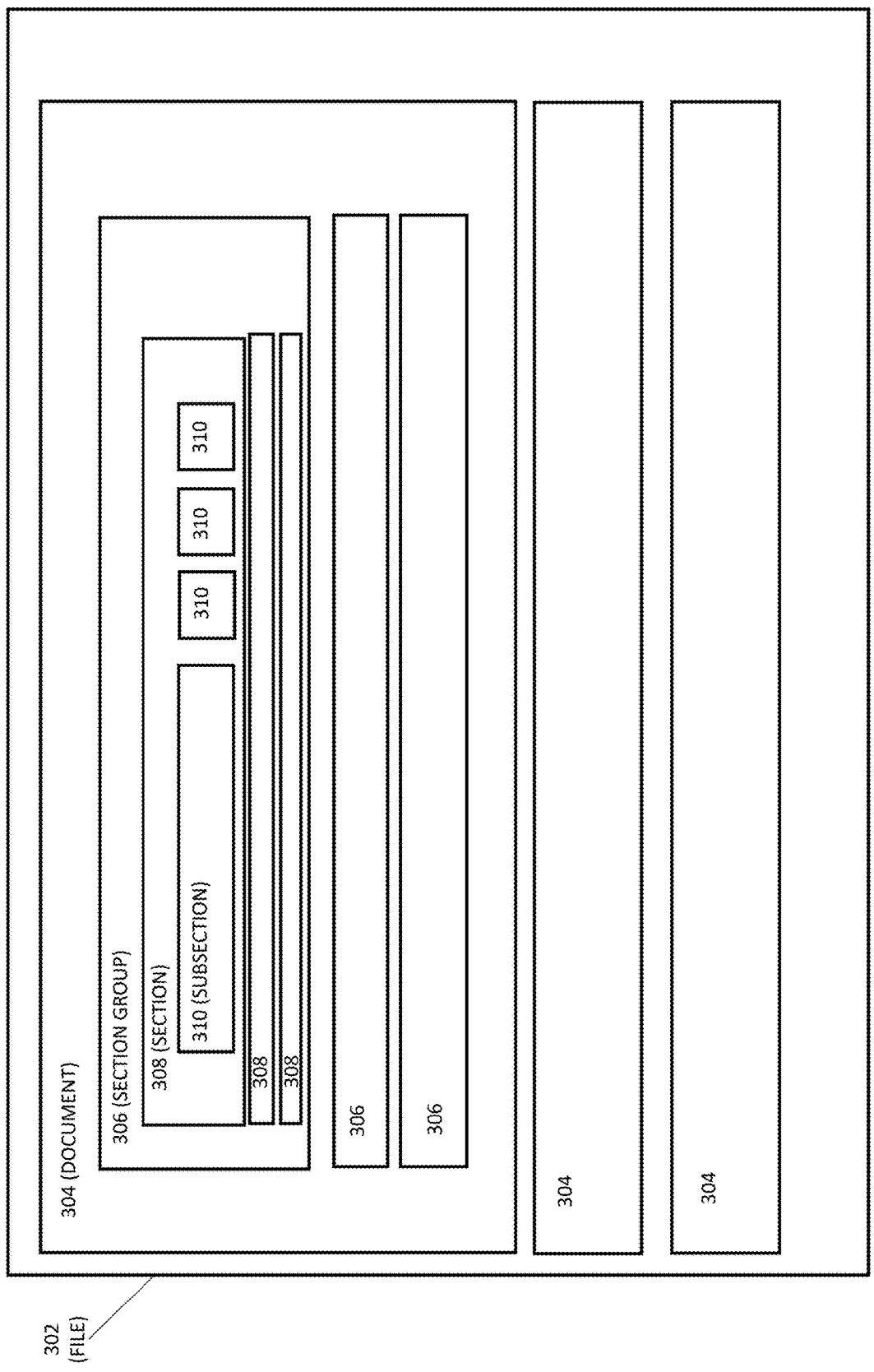
FIG. 3 is a block diagram illustrating aspects of an example file that can be accessed and processed in accordance with the present disclosure.

In one or more implementations, a document is received, such as an attachment in an email message from a subscribing company, and the document is processed to identify, extract, and generate data therefrom, for example, for mapping to a respective schema. FIG. 3 is a block diagram illustrating aspects of an example file that can be accessed and processed, in accordance with the present disclosure. In the example shown in FIG. 3, file 302 includes a plurality of documents 304. Metadata or other information associated with file 302 can indicate, for example, the number of documents 304 that are included within file 302, which can be used by one or more processors to split the documents 304 from file 302 for further processing. Alternatively, one or more algorithms be executed by, for example, information processor 102 to recognize and/or distinguish respective documents 304 included in a file 302. Respective processing can be selected to improve computing resource efficiency, including in terms of accuracy, costs and time. Moreover, the present disclosure provides for improved functioning of a computing system by identifying and processing documents in previously unavailable ways, such as via a respective parser pipeline as shown and described herein.

Continuing with reference to FIG. 3, document 304 can include one or more section groups 306, and each section group 306 can include one or more sections 308. For example, document 304 includes two section groups 306 that represent two respective agreements between respective buyers and sellers. Each of the section groups 306 can include sections 308, such as covering products, quantities, delivery periods, delivery points, or the like. Also as illustrated in FIG. 3, each respective section 308 can include one or more subsections 310. For example, a given contract (document 304) can include a plurality of pricing terms, each associated with a respective set of conditions. In such cases, the pricing terms can be considered subsections 310 within a pricing section 308. Identifying and processing subsections 310 for downstream processes further enhances the efficiency and operations of a computing system in accordance with the present disclosure.

In one or more implementations of the present disclosure, a graphical user interface can be provided that includes a document viewer section that includes a view of document 304 in its original format and can dynamically provide additional formatting and display techniques to identify a specific part or portion of the document being acted on by the user. Moreover, following processing shown and described herein, a document parser map section can provide information associated with the document 304, including document name, invoice number, invoice date, payment terms, supporting documentation, client code, and other associated fields. Much of the information provided in a document parser map section can have been previously extracted from the original document 304 following artificial intelligence procedures performed on the original document, pursuant to machine learning. Such machine learning and artificial intelligence can be provided via one or more commercial offerings, such as offered by AMAZON WEB SERVICES, MICROSOFT, IBM, or other provider, or otherwise can be developed in the enterprise. Referred to herein, generally, as a machine learning/artificial intelligence engine, document processing is provided thereby using artificial intelligence and machine learning. Accordingly, an invoice or virtually any other document 304 can be received from a counterparty and, thereafter, processed to extract data, such as by breaking down the invoice to fields and tables. As a user interacts with a GUI, the user's actions can be tracked, thereby providing a historic roadmap that can be used for future machine learning and improved artificial intelligence.

The present disclosure provides technological improvements, including for improving the functioning of computing devices, which would otherwise require interfacing with machine learning/artificial intelligence systems. Such processing can include submitting or resubmitting documents to engage in training or re-training processes, which are computationally demanding and involve specialized skills required of computer programmers an artificial intelligence developer. The features shown and described herein leverage an ability to customize machine learning/artificial intelligence to locate data that otherwise could not be found.

Figure 17:
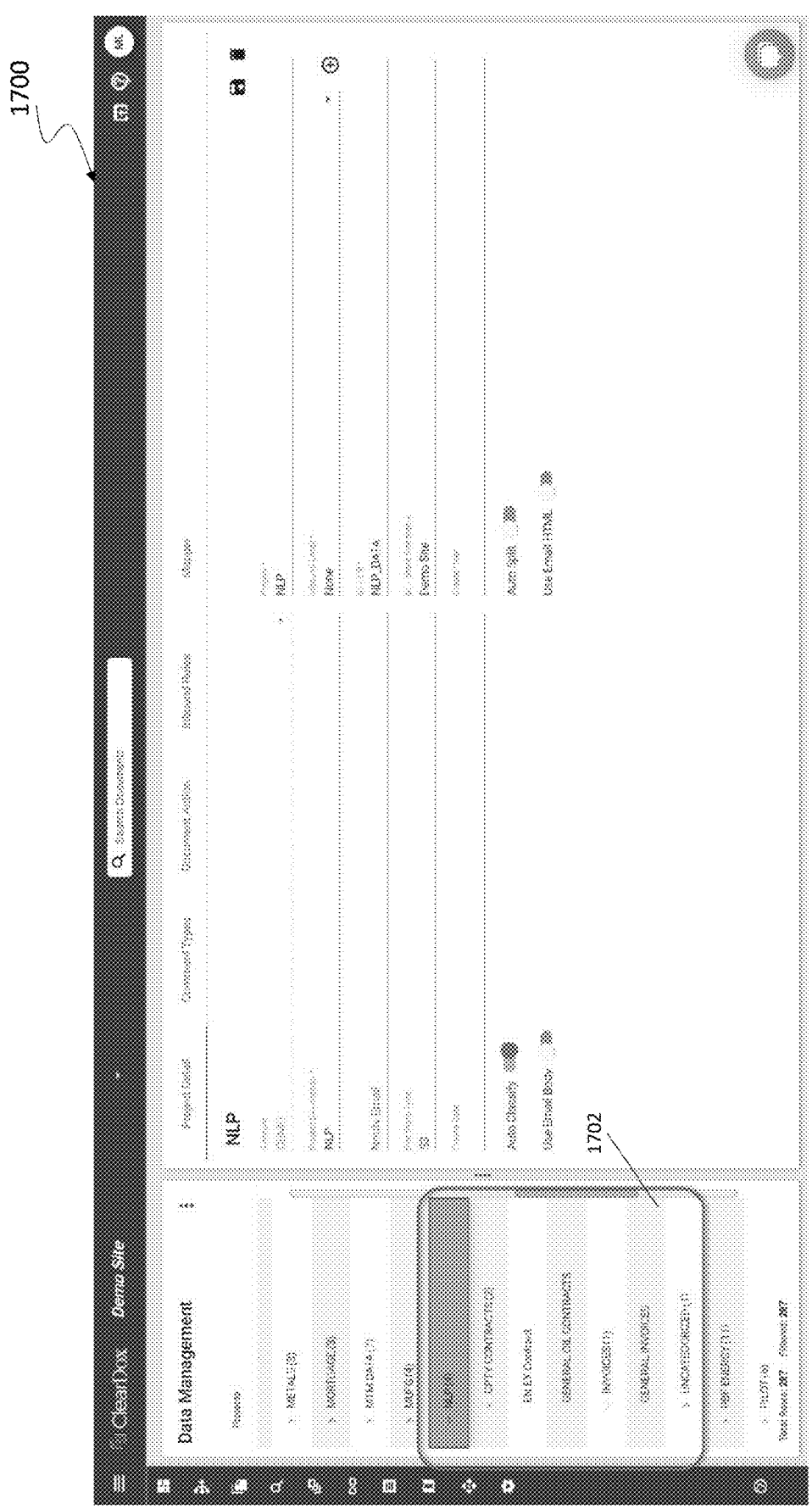
FIG. 17 illustrates an example create new project display screen, in accordance with an example implementation of the present disclosure.

In one or more implementations, a generic parser can be cloned and used as a starting point for setting up new parsing operations using NLP. In cases where, for example, a layout of a given document 304 does not work well in the generic parser, segmentation and a custom form based parser can be used (see, for example, FIG. 15). In respective implementations, features of the present disclosure, such as segmentation and selections of a respective model can be disabled or enabled. In one or more implementations, a parser can be configured with an appropriate classification type (e.g., a contract document or an invoice document). An example create new project display screen 1700 is shown in FIG. 17, including NLP section 1702 identifying in which an INVOICES category and CPTY CONTRACTS category have been created and configured for respective the parsers. In the event a document 304 is imported into an uncategorized document type, one or more auto-classification procedures can be implemented.

Figure 4A:
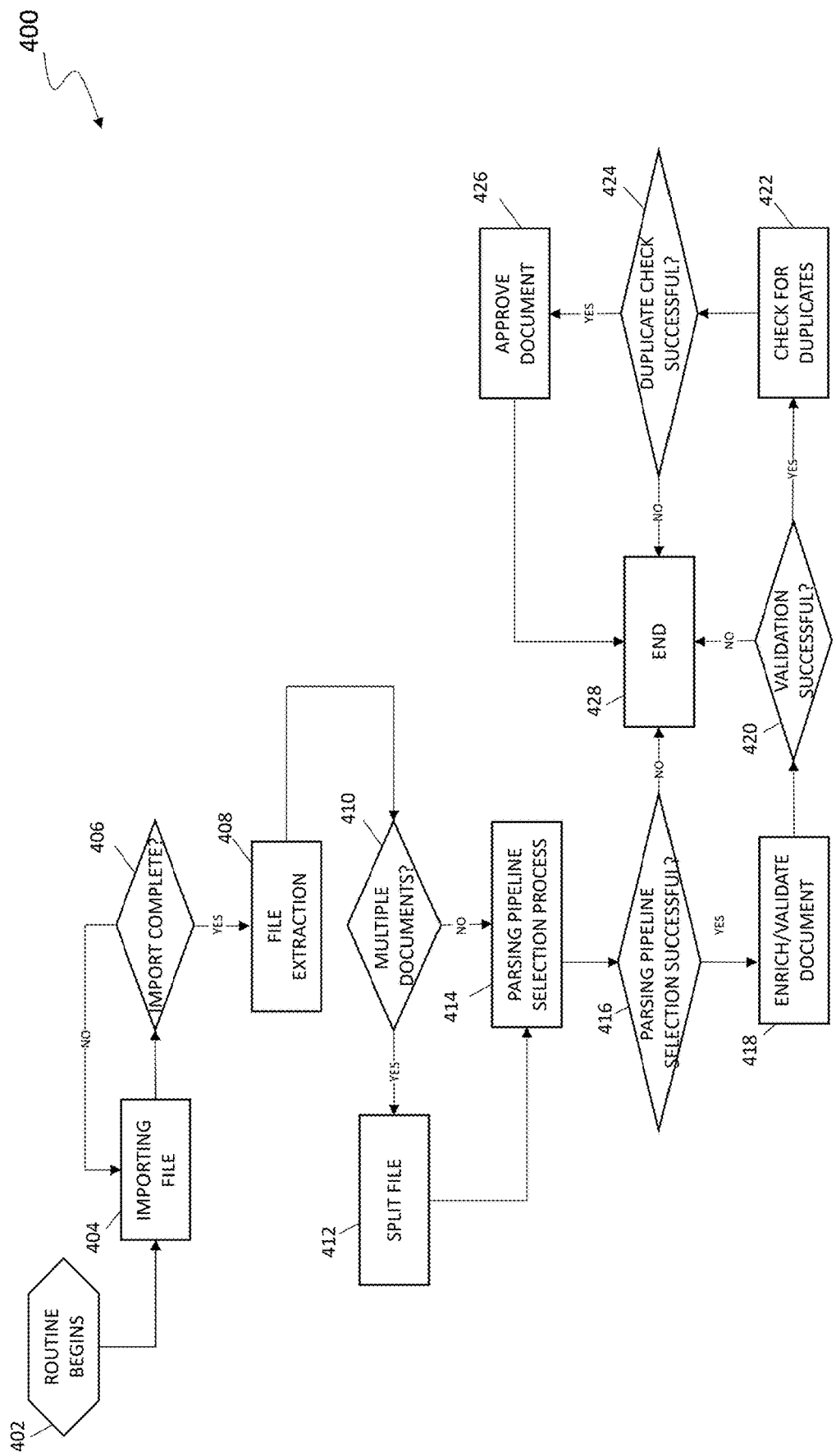
FIGS. 4A and 4B are process flows illustrating example steps that are associated with document import and processing, in accordance with one or more example implementations of the present disclosure.

FIG. 4A is a process flow illustrating example steps 400 that are associated with importing and processing a file 302 in accordance with an example implementation of the present disclosure. It should be appreciated that several of the logical operations described herein such as, but not limited to, steps in FIGS. 4-7 can be implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.) or design preference. Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

In the example steps 400 shown in FIG. 4A, the process begins at step 402 and an import file step begins (step 404). At step 406 a determination is made whether the file import is complete. If the process has not completed, such as the entire file has not yet completed being imported, the process branches back to step 404 and the import step continues. Alternatively, if the determination at step 406 is that the file is fully imported, then the process branches to step 408 and a file extractions operation runs.

Continuing with reference to the example steps 400 shown in FIG. 4A, a determination is made whether the file 302 includes multiple parts, such as whether multiple documents 304 are included within the file 302 (step 410). If the determination at step 410 is affirmative, then the process branches to step 412 and a splitting procedure is invoked to split one or more documents 304 from the file 302. Once split, the process continues to step 414 and a parsing pipeline selection process is invoked. Alternatively, if the determination at step 410 is negative, then the process branches to step 414 without invoking splitting a document 304 from a file 302, and the parsing pipeline selection process step 414 is invoked.

Continuing with reference to the example steps 400 shown in FIG. 4A, following step 414, a determination is made at step 416 whether the respective parsing pipeline selection in step 414 was successful. If the determination at step 416 is affirmative, then the process branches to data enrichment step 418. Data enrichment can be provided as a function of natural language processing and applications of one or more respective models, such as pre-configured models associated with respective document types. Thereafter, the process continues to step 420 and a determination is made whether the document 304 can be successfully validated, such as in connection with an applied model. If so, the process continues step 422 and a check for duplicates is performed. Thereafter, the process continues to step 424 and a determination is made whether the duplicate check was successful. If the outcome at step 424 is affirmative, then the process branches to document approval step 426, and then the process ends at step 428. Alternatively, if the determination at step 416 is that the parse was not successful, if the determination at step 420 is that the validation is not successful, or if the determination at step 424 is that the duplicate check is not successful, then the process branches to step 428 and the process ends.

Thus, and as shown in connection with the example flowchart shown in FIG. 4A, the present disclosure includes processing steps, which can be configured to execute, for example, in response to a parameter or other setting defined at a project level. In one or more implementations, classification processes in accordance with the present disclosure are available for documents formatted in the ADOBE PORTABLE DOCUMENT FORMAT ("PDF"), MICROSOFT WORD format, or an ASCII text document. As shown and described herein, classification options can include processing steps for identifying documents and natural language processing. Moreover, document identification processes in accordance with the present disclosure can reference information stored document identity store 103C to recognize a start (i.e., first) page of each respective ones of a plurality of documents 304 included with a single accessed file 302. Different types of documents 304 can be identified within a single file split, such as invoices, bills of lading, or other documents associated with, for example, shipments.

Figure 4B:
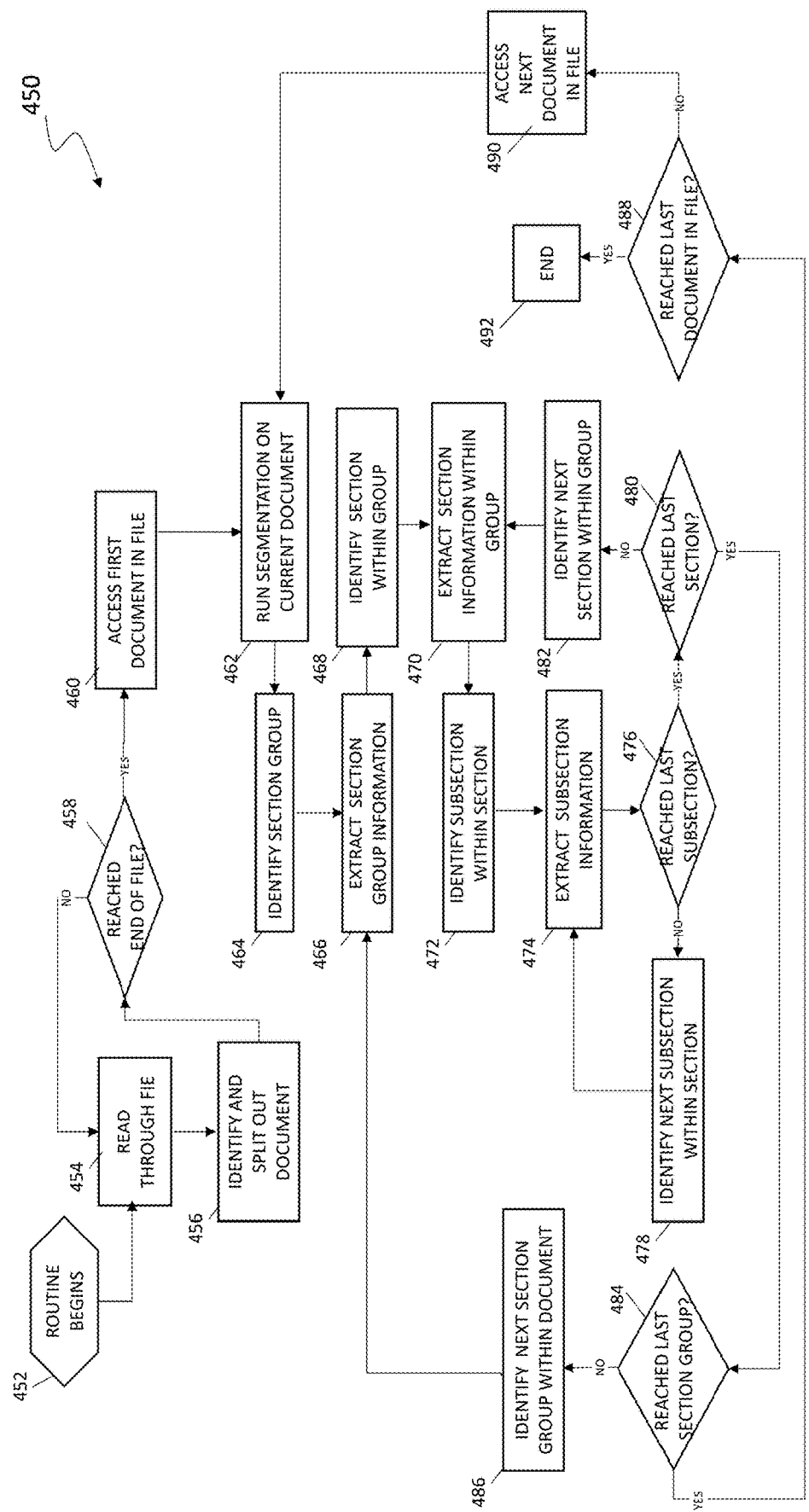

FIG. 4B is a process flow illustrating example steps 450 that are associated with document import and processing in accordance with an example implementation of the present disclosure. At step 452, the routine begins and a file 302 that has been accessed, such as imported, received by e-mail, FTP, or accessed in another suitable way, is read through (step 454). For example, an OCR process is run on a file 302 and the text that is extracted therein is identified and/or accessed. Thereafter, at step 456, a document 304 that is included within the file 302 is identified. For example, one or more anchor terms can be located and identified to represent a new document identifier. As shown and described herein, anchor terms can include information that can be recognized as indicia of a respective document, such as a start of a new document, within a file 302. Once a document is identified, the process continues to step 458 and the determination is made whether the end of the file 302 has been reached. If not, the process branches back to 454. If the determination at step 458 is affirmative, then the first document in the file 302 is accessed at step 460.

Continuing with the example process flow shown in FIG. 4B, a segmentation process is run at step 462 on the current document. As noted herein, segmentation can be turned on or off in various ways, such as through user parameters defined at a file level, document level, or more granularly, such as at a respective section group or section. At step 464, a section group is identified and, thereafter, section group information is extracted (step 466). Thereafter, the process flows to step 468, and a section within a section group is identified. Section information within the group is extracted at 470. Thereafter, the process flows to step 472 and a subsection within a respective section is identified and, thereafter, information associated with the subsection is extracted (step 474). Thereafter, at step 476 a determination is made whether the last subsection within a section has been reached. If the determination at step 476 is negative, then the process branches to step 478 and the next subsection within the section is identified. Thereafter, the process flows to step 474. Alternatively, if the determination at step 476 is affirmative, then the process flows to step 480 and a determination is made whether the last section within the document has been reached. If the determination at step 480 is negative, then the process branches to step 482 and the next section within the section group is identified period from there, the process flows back to step 470. Alternatively, if the determination at step 480 is affirmative, then the process branches to step 484 and the determination is made whether the last section group within the document has been reached. If the determination at step 484 is negative, then the process branches to step 486 and the next section group within the document is identified. Alternatively, if the determination at step 484 is affirmative, then the process branches to step 488, and a determination is made whether the last document within the file 302 has been reached. If the determination at step 488 is negative, then the process branches to step 490 and the next document in the file 302 is accessed period from there, the process flows to step 462. Alternatively, if the determination at step 488 is affirmative, then the process branches to step 492 and the process ends.

Thus, as shown and described herein with reference to FIG. 4B, the present disclosure supports accessing a file 302, reading through the file to identify respective documents 304, and segmenting each document located in the file to identify respective ones of section groups 306, sections 308, and subsections 310. Although the implementation shown and described with reference to FIG. 4B integrates certain processes, such as accessing a file 302, identifying and splitting one or more documents 304 from the file 302, and segmenting sections therefrom, one or more other implementations can implement fewer of these processes. For example, a process can include reading through a file 302, identifying documents 304 therein, and splitting documents therefrom. Thereafter, a separate process can be executed that segments one or more of the documents. Moreover, not all of the steps shown and described herein with respect to FIG. 4B may be included in a given implementation. For example, a document may not include any section groups, sections, or subsections, which can eliminate a need to execute all of the steps shown and described in FIG. 4B. Accordingly, depending on a respective design implementation and a respective file 302 being acted on, one or more of the steps shown in the process flows can be eliminated.

Figure 5:
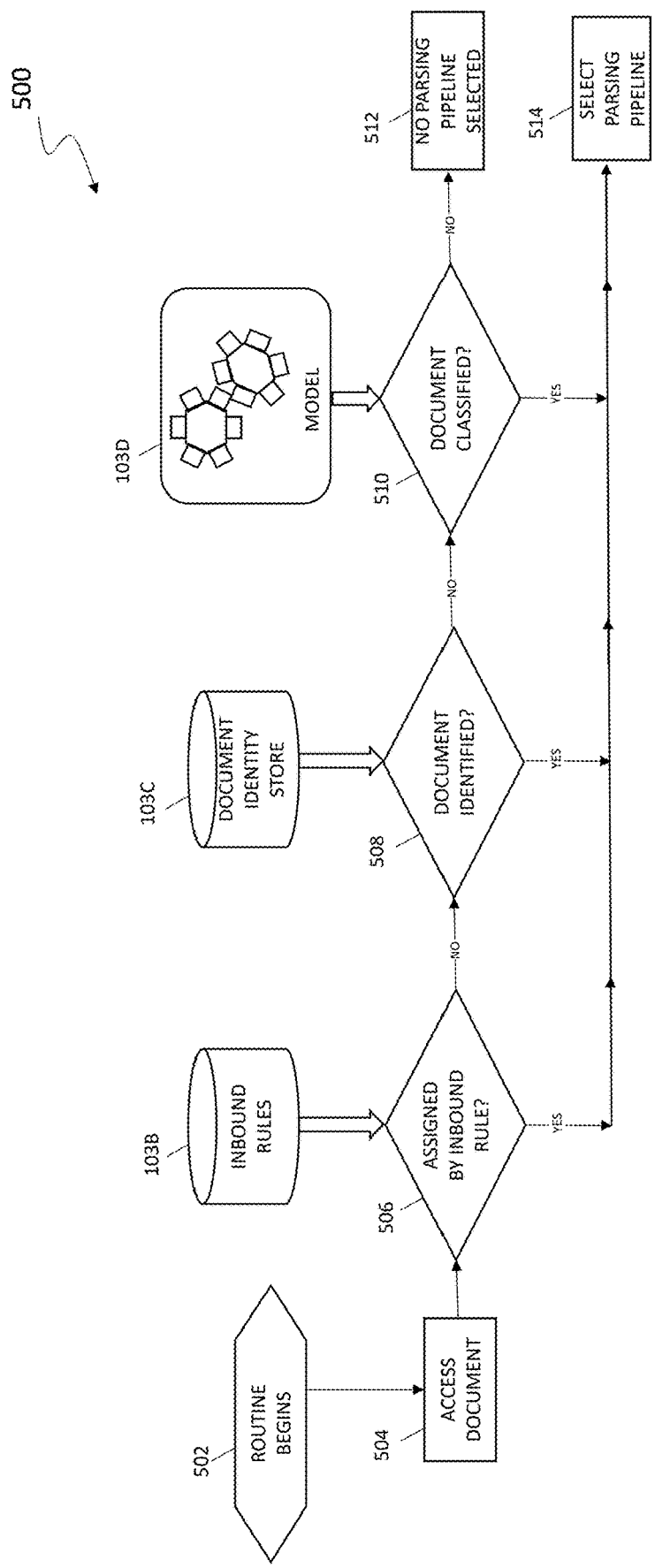
FIG. 5 is a process flow illustrating example steps that are associated with document processing in connection with selection a parsing pipeline, in accordance with an example implementation of the present disclosure.

FIG. 5 is a process flow illustrating example steps 500 that are associated with file and document processing in accordance with an example implementation of the present disclosure. The routine begins at step 502, and a document 304 is accessed (step 504), for example, having been identified in a given file 302. Thereafter, inbound rules 103B are referenced and a determination is made at step 506 whether the document 304 accessed at step 504 is assigned by inbound rules for selecting a respecting parsing pipeline. For example, the determination at step 506 can be based on metadata or other provided information associated with the respective document 304. Using metadata or other provided information, the present disclosure can improve computing systems, such as by eliminating a need to inspect the contents of the document 304. If the determination at step 506 is negative, then the process branches to step 508. At step 508, the document 304 can be inspected and a reference made to document identity store 103C to determine whether a respecting parsing pipeline is identified for the document 304 accessed at step 504. If the determination at step 508 is negative, then the process branches to step 510. At step 510, a respective model from models 103D or other suitable extraction process can be applied on the document, such as GOOGLE DOC A/I, AMAZON WEB SERVICES TEXTRACT, and a determination made for selecting a respective parsing pipeline for the document 304. If the determination at step 510 is negative, then the process branches to step 512 and the document accessed in step 504 is deemed to be unclassified and, accordingly, no parsing pipeline selected.

Alternatively, if the determination at step 506 that the document accessed in step 504 is assigned by an inbound rule, or if the determination at step 508 that the document accessed in step 508 is identified, or if the determination at step 510 that the document accessed in step 504 is classified, then the process branches to step 514 and a respective parsing pipeline selected.

Thus, as shown an described herein, processes in accordance with the present disclosure can include respective degrees of processing for determining whether a respective parsing pipeline can be selected. For example, a first level of classification can include accessing and applying inbound rules 103B, which can be applied to route inbound documents to a respective project. In operation, applying inbound rules 103B can route an inbound document to a recognized specific document type or to a classification of being uncategorized. A second level of classification can include document identification, in which documents are identified prior to being onboarded and trained against a parser. Multiple variations of a respective document or a start (or first) page of a document can be handled as a function of the second level of classification. In one or more implementations, document identification can be enhanced via one or more custom anchor terms that can be defined. Upon recognition of an anchor term, for example, document classification can occur. A third level of classification can use of a trained model to classify text of a respectively accessed document. Once classified, documents can be assigned to a respective one parsing pipeline.

Figure 6:
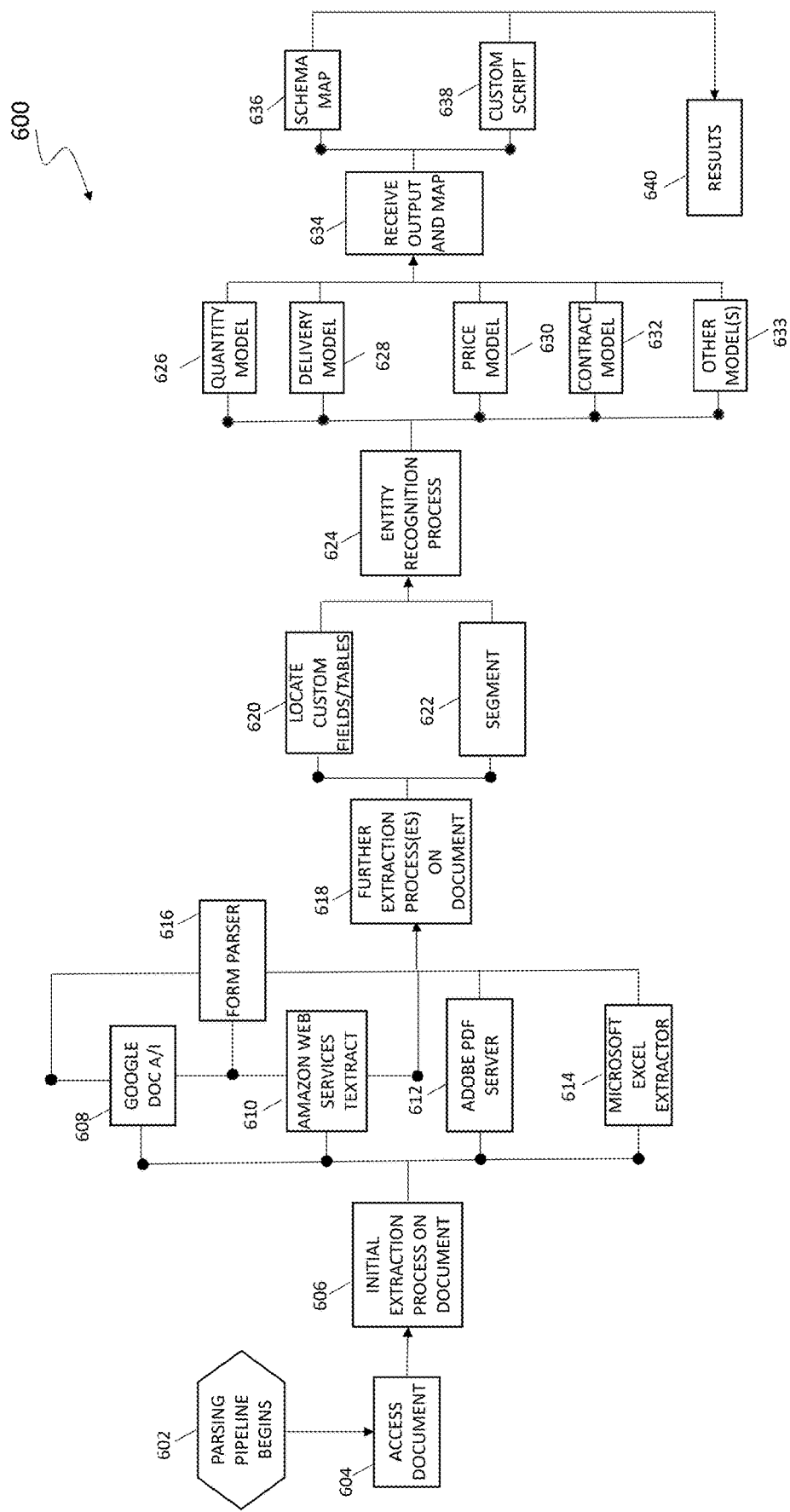
FIG. 6 is a process flow illustrating example steps that are associated with a parsing pipeline, in accordance with an example implementation of the present disclosure.

FIG. 6 is a process flow illustrating example steps 600 that are associated with data parsing and processing (referred to generally, herein, as a "parsing pipeline"), in accordance with an example implementation of the present disclosure. The parsing pipeline process 600 begins at step 602, and a document is accessed (step 604). At step 606, an initial extraction process is performed on the document accessed at step 604. Example processes can include, without limitation, GOOGLE DOCS ARTIFICIAL INTELLIGENCE ("A/I") 608, AMAZON WEB SERVICES ("AWS") TEXTRACT 610, ADOBE PDF SERVER 612, and MICROSOFT EXCEL EXTRACTOR 614. Form parser process 616 can be invoked, for example, in response to GOOGLE DOCS A/I 608 or AWS TEXTRACT 610. It is to be appreciated that while the features shown and described in accordance with the steps in FIG. 6 are available, processing via the various services and models can carry additional costs, for example in terms of money, time, and computing resources. Accordingly, the present disclosure supports customization for project by project use, and even document by document use, which can result in certain ones of the features shown in FIG. 6 to be enabled or disabled depending on the context of a particular document and its associated intake process. In one or more implementations, selections of the respective resources can be made or at least suggested via artificial intelligence.

Continuing with reference to the example flowchart shown in FIG. 6, at step 618 further extraction process(es) can be performed. For example, custom fields or tables can be located (step 620) and segmentation processes (step 622) can be invoked to analyze contents of the document accessed in step 604. Thereafter, at step 624, entity recognition processes can be employed. For example, a quantity model (step 626), delivery model (step 628), price model (step 630), and contract model (step 632) can be used for a contract, delivery order, pricing, and sales contract, respectively. It is to be appreciated that other models (step 633), depending on a respective design implementation can be used, without departing from the teachings herein. Moreover, at step 634, output from a respective modeling processes is received and mapped, including for schema mapping 636 and custom script mapping 638. Thereafter, the process continues to step 640 and results of the parser pipeline 602 are provided, such as via a GUI for downstream processes.

The present disclosure supports each step of the example parsing pipeline shown in FIG. 6 to be configurable and designed to support plug-and-play services. As shown and described herein, the initial extraction process 606 can be configured to use an appropriate OCR service, and to support use of AWS TEXTRACT, GOOGLE DOC A/I, PDF SERVER AND EXCEL extraction. Moreover, analysis features can allow users to define custom extraction into respective data fields and tables. Still further, the parsing pipeline of the present disclosure can support segmentation for complex documents that include a plurality section groups, sections, and/or subsections. Still further, entity recognition (also referred as "named entity recognition") can be applied against virtually any portion of a document, and a plurality of targeted models can be applied against the document, section group, section, and/or subsection. Thereafter, the present disclosure supports use of schema mapping, including to normalize output from raw parsing operations into a structured schema model. Thus, the features and operations associated with the parsing pipeline of the present disclosure allow for customization of mapping logic.

Figure 7:
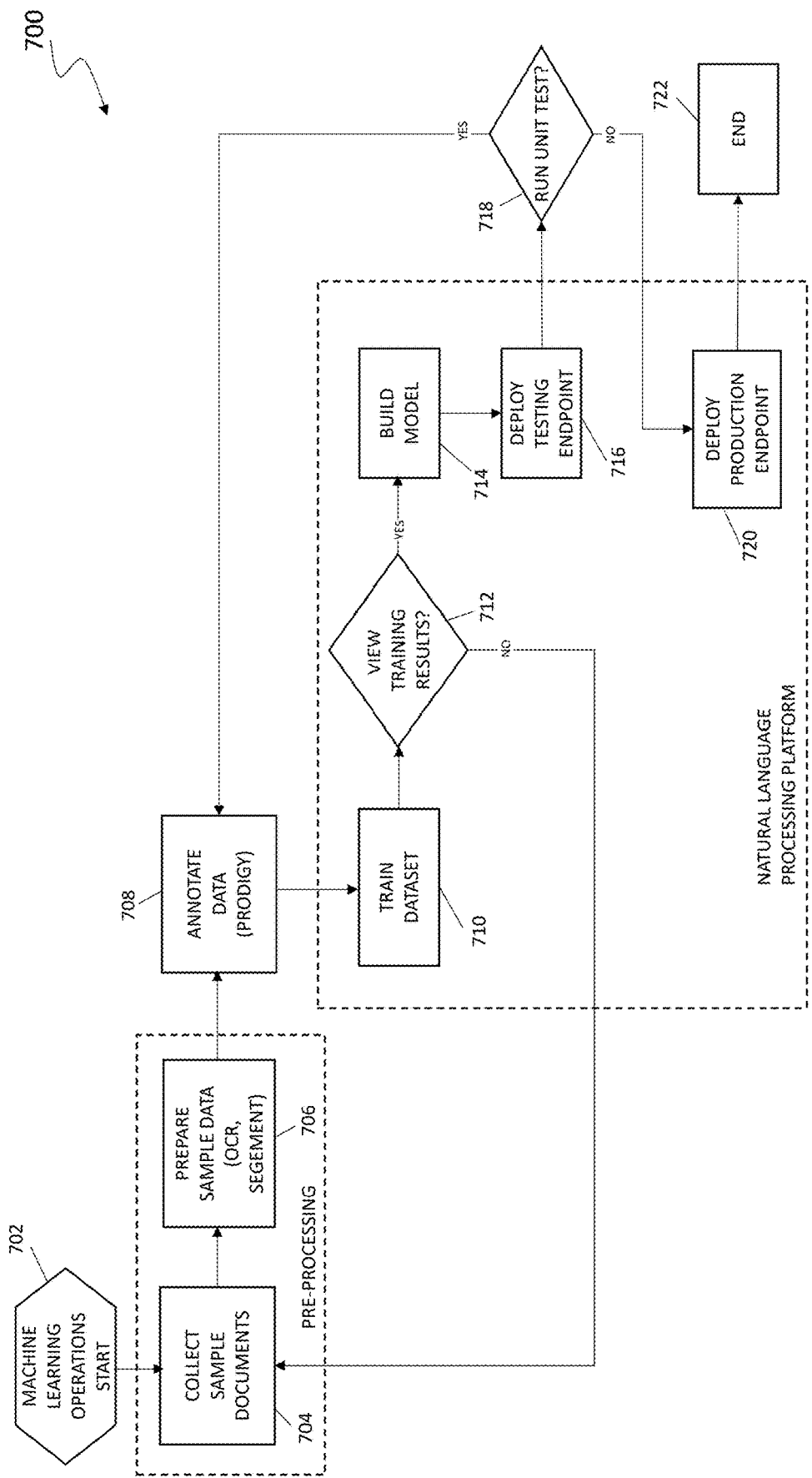
FIG. 7 is a process flow illustrating example steps that are associated with machine learning operations and processing, in accordance with an example implementation of the present disclosure.

FIG. 7 is a process flow illustrating example steps 700 that are associated with machine learning operations and processing, in accordance with an example implementation of the present disclosure. The machine learning process begins at step 702, preprocessing steps are performed, including collecting sample documents 704 and preparing sample data (e.g., optical character recognition ("OCR") and segmentation) 706. Thereafter the process flows to, data annotation step 708, for example via PRODIGY annotation tool. The process continues to perform steps associated with a natural language processing platform, including to train a dataset (step 710). After training, a determination is made at step 712 whether training results can be viewed. If the determination in step 712 is negative, then the process branches back to step 704 for further preprocessing. Alternatively, if the determination in step 712 is affirmative, then the process branches to step 714 and a NLP model is built. Thereafter, the process continues to step 716 for deploying a testing endpoint.

Continuing with reference to the example flowchart shown in FIG. 7, following the testing endpoint deployment in step 716, the process continues to step 718 and a determination is made whether a unit test is indicated to account for degradation or other shortcoming resulting from the model process. If the determination in step 718 is affirmative, then the process branches back to step 708 for further data annotation, for example via PRODIGY annotation tool. Alternatively, if the determination in step 718 is negative, then the process branches to step 720 and a production endpoint is deployed. Thereafter, the process ends at step 722.

In accordance with one or more implementations of the present disclosure, the machine learning operations shown and described herein corresponds to the steps and the dynamic configuration associated with the parser pipeline, for example, with regard to OCR, form parser, segmentation, or other configuration. Machine learning operations can be provided as a cloud-based service, provided as local services, or as a semi-automated hybrid configuration. Moreover, models can be validated via a holdout set incorporated into an automated pipeline, which improves or ensures model integrity over time, such as between respective software releases and model versions. As noted above, annotation can be performed using PRODIGY or other suitable application. It is recognized herein that following an annotation process, corrections may be necessary, which can be via A/I process, such as provided by VERTEX AI. In one or more implementations, a development environment can be maintained separate from a production environment, for example, which can secure production models and endpoints from possible errors introduced by developers.

Processes associated with the document workflow of the present disclosure can be improved, for example, by providing access to customer-level data marts conveniently and securely. For example, standard query language ("SQL")-like statements can be generated using one or more third-party and/or internally developed resources, thereby allowing users who may not be sophisticated software engineers to implement operations shown and described herein, including by using professional service resources. Moreover, information can be generated automatically, such as documentation and lineage graphing services, and standard source code processes can be implemented to reduce or eliminate a need for re-engineering of complex operations and provides non-developers to process documents quickly and accurately.

Figure 8:
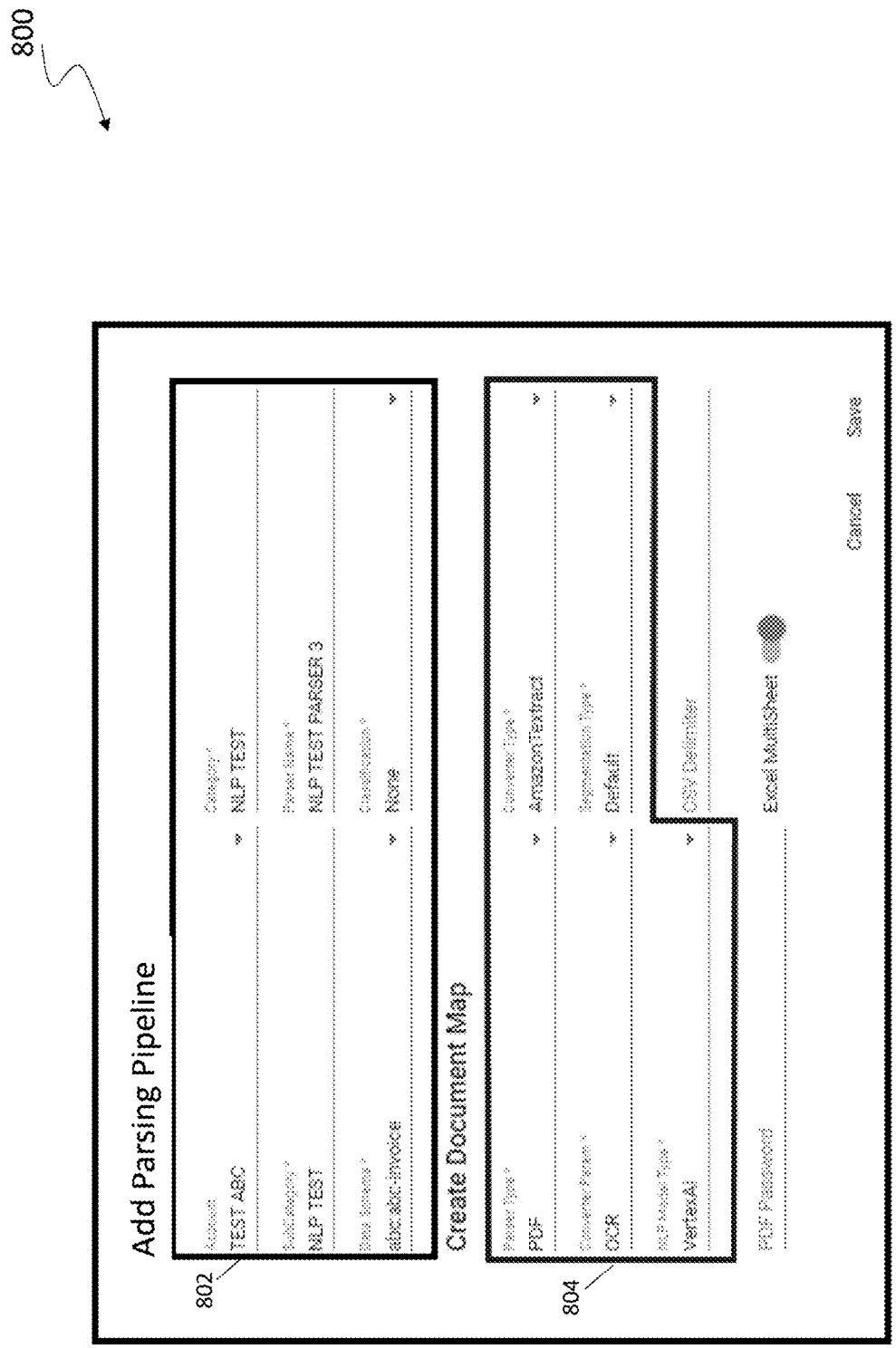
FIG. 8 illustrates a display screen provided in an example graphical user interface ("GUI") that includes add new parser section and create document map section, in accordance with an example implementation of the present disclosure.

Features of the present disclosure are now further described with reference to FIGS. 8-17. Multi-part documents being processed in accordance with the present disclosure can be segmented into small, manageable sections, and output from segmentation processes can be displayed. FIG. 8 illustrates a display screen 800 provided in an example graphical user interface ("GUI") that includes add new parsing pipeline section 802 and create document map section 804. The controls provided in sections 802 and 804 enable specific configuration that may be required to provide a new parser for, for example, PDF or Text files, and to set values associated with Converter Type, Converter Parameter, Segmentation Type, and NLP Model Type. Moreover, multiple methodologies are available, including form extraction via artificial intelligence and machine learning to recognize tables and fields. Values associated with these fields can be selected based on a respectively selected parser type.

Figure 9:
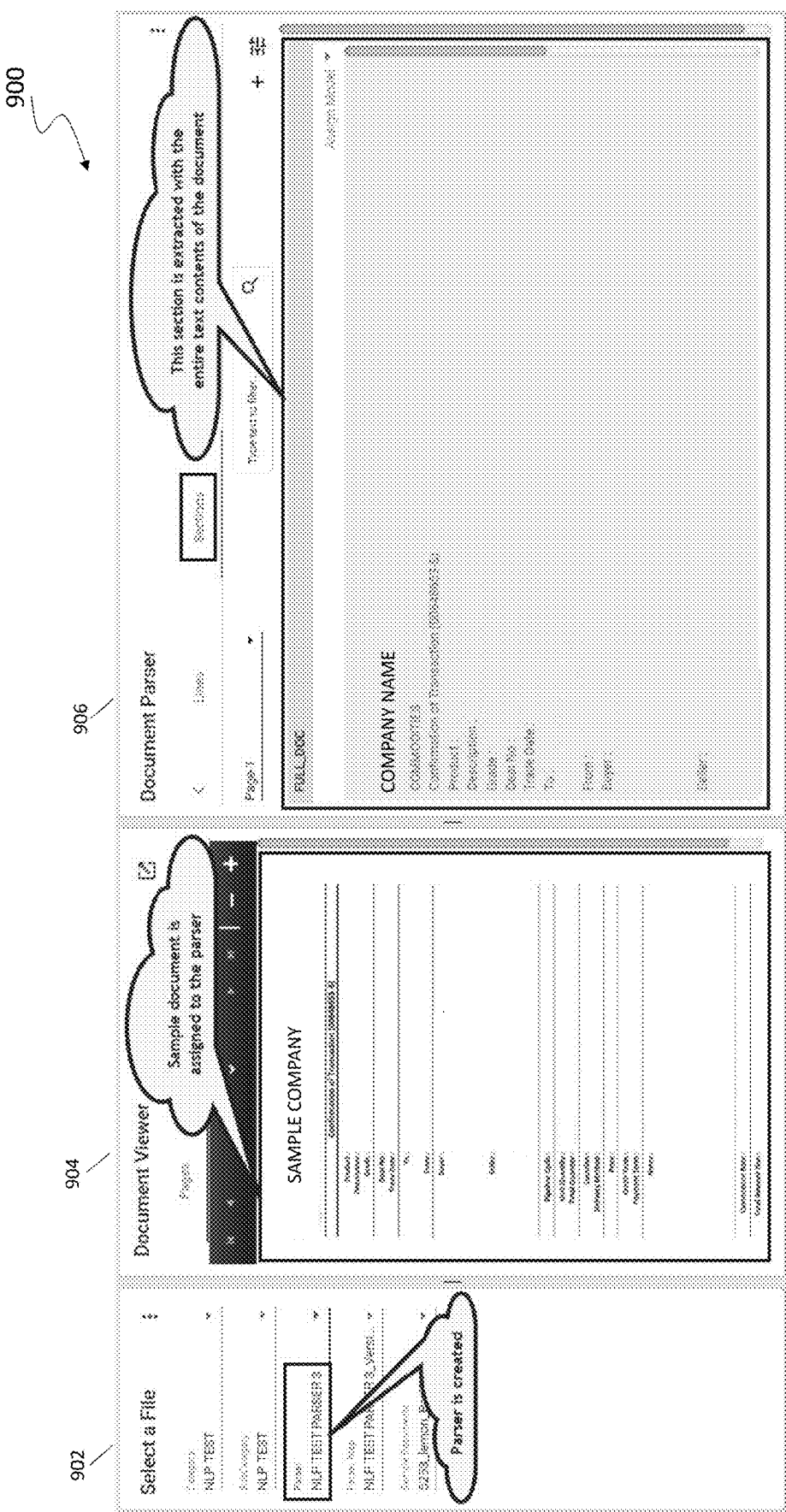
FIG. 9 shows an example display screen in a graphical user interface after a sample document has been imported, in connection with an example implementation of the present disclosure.

Once a new parsing pipeline is created, such as via controls set forth in display screen 800, a sample document can be assigned to the parser, and text contents (e.g., all pages) of the original document can be automatically extracted and displayed, such as shown in display screen 900 (FIG. 9). For example and as shown in FIG. 9, a file 302 is selected in section 902, in which the respective parser created via controls shown in FIG. 8 (e.g., "NLP TEST PARSER 3") has been selected. Moreover, document viewer section 904 can be configured to display a sample document that has been assigned to the parser selected in section 902. Document parser section 906 identifies the extracted information, including by displaying the textual contents of the document. Accordingly, FIG. 9 shows an example display screen in a graphical user interface after a sample document has been imported in connection with an example implementation of the present disclosure.

Figure 10:
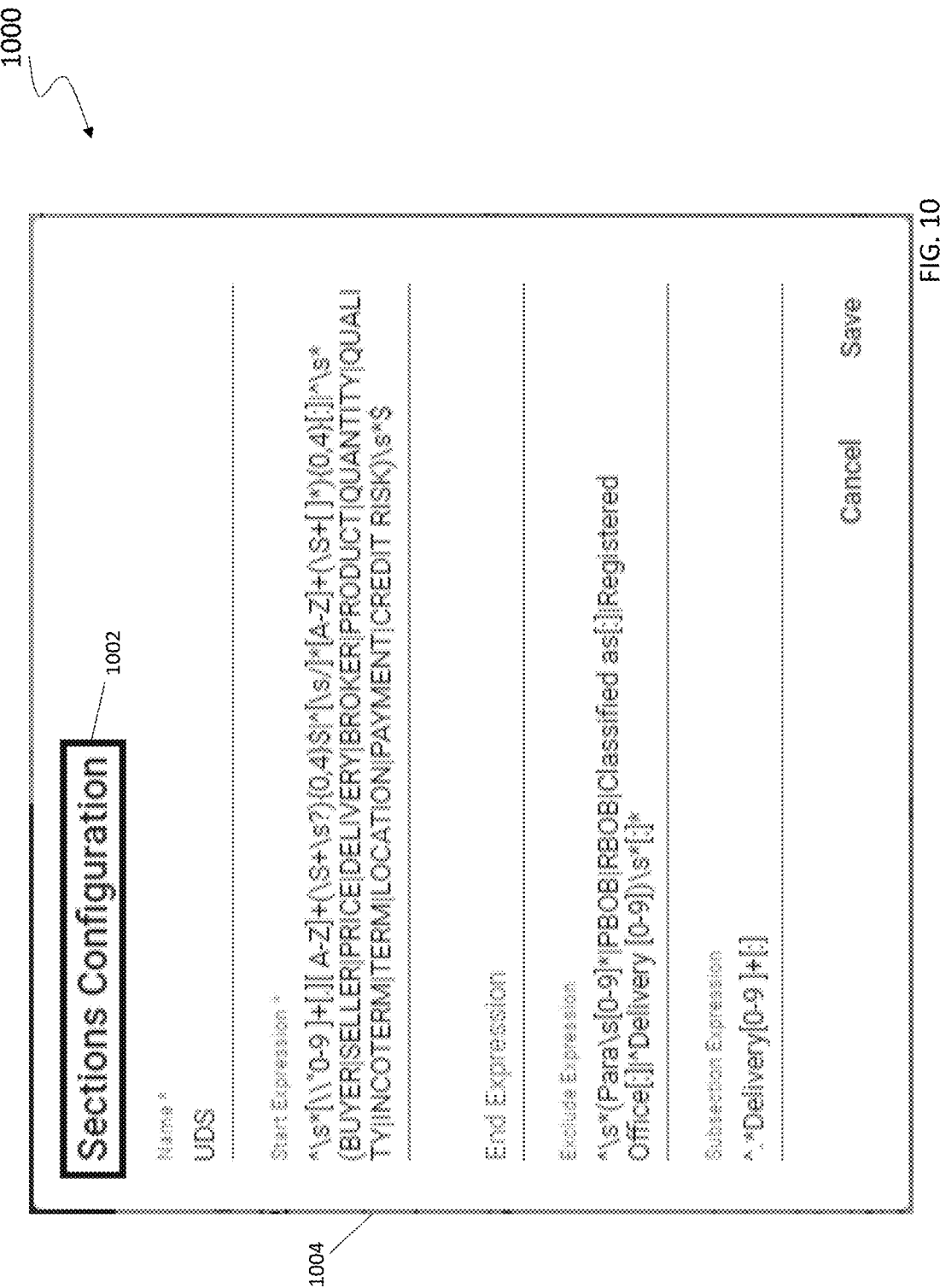
FIG. 10 illustrates an example display screen that includes options for a user to provide a name, a start expression, an end expression, an exclude expression, and a subsection expression for an expression configuration file, in accordance with an example implementation of the present disclosure.

After a document has been successfully imported, segmentation routines may be appropriate in the event that the document contains multiple parts (e.g., the document contains subsections, sections, and/or subsections). As noted herein, the present disclosure provides a segmentation solution for identifying and processing respective parts of a document. In one or more implementations, each type of document can be segmented in accordance with a specific, albeit regular, expression configuration file. FIG. 10 illustrates an example display screen 1000 that includes options for a user to provide a name, a start expression, an end expression, an exclude expression, and a subsection expression for an expression configuration file. The name field can represent a unique name for a respective document section, And the start and end expressions can be used to indicate the start and ending of a respective section. An exclude expression can be used to indicate expressions to exclude from the start expression, and the subset expression can be used to indicate a subsection within a respective section.

Figure 11:
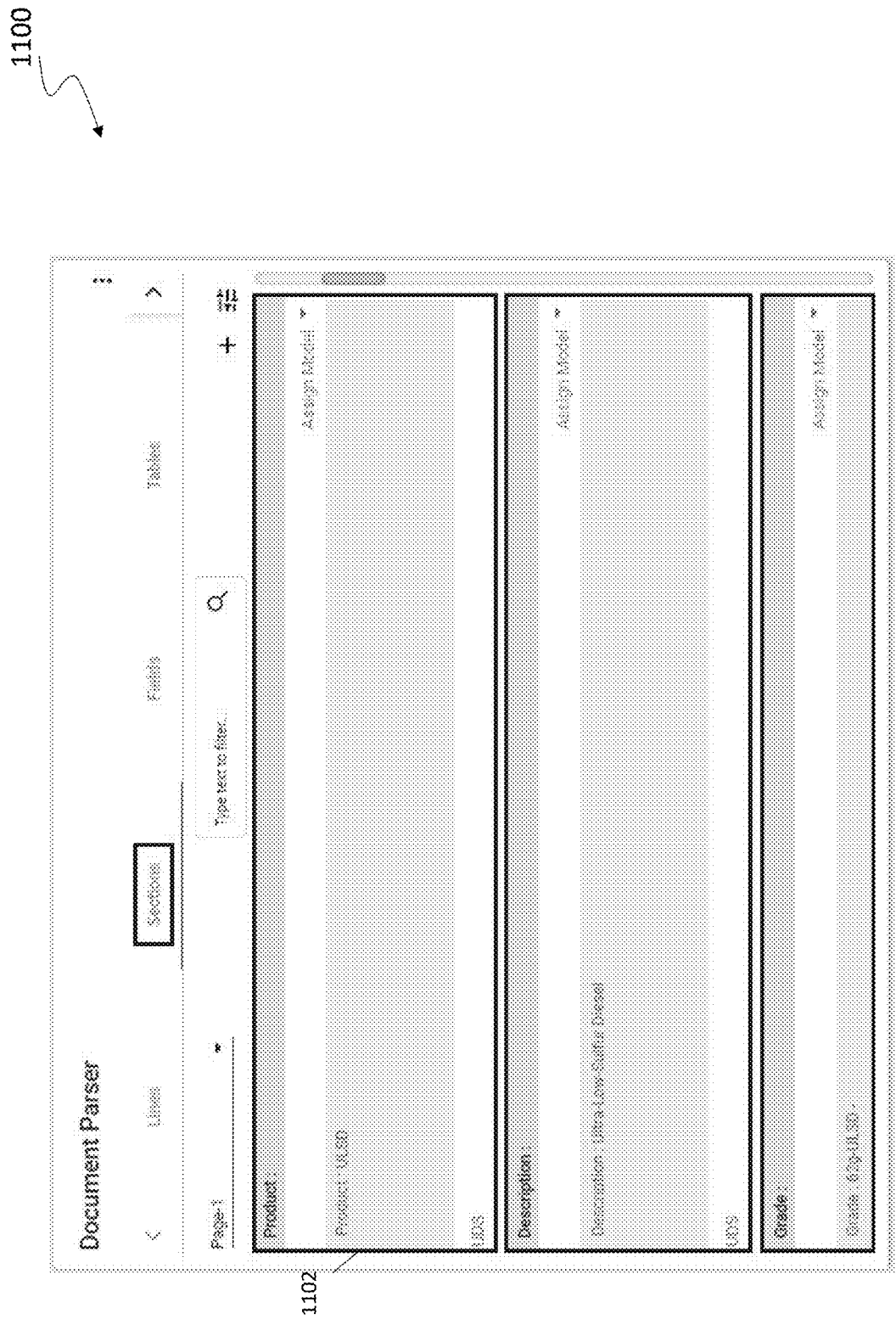
FIG. 11 illustrates an example display screen that includes controls to identify document sections, in accordance with an example document parser graphical user interface.

Once appropriate inputs have been submitted, the user can submit select Save or Cancel to continue or cancel the operation. Documents can, thereafter, be segmented into many small sections based on the defined expressions and the respective sections can be displayed with corresponding section headers. FIG. 11 illustrates an example display screen 1100 that includes controls to identify document sections in accordance with a document parser graphical user interface. In the example shown in FIG. 11, sections are shown for a product, description, and grade, and respective models can be assigned therefore for downstream processing.

Figure 12:
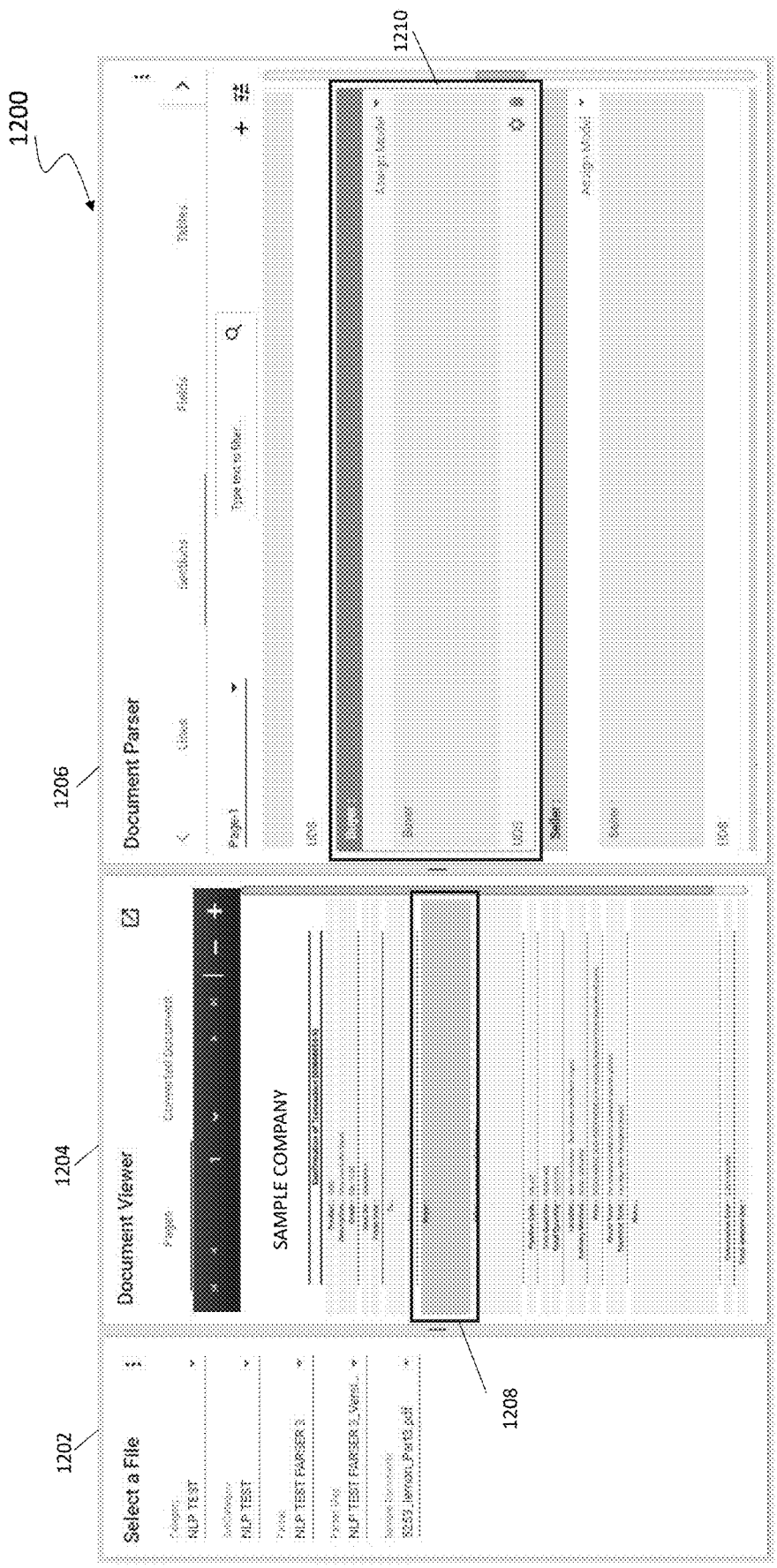
FIG. 12 illustrates an example display screen that includes file selection section, document viewer section, and document parser section, in accordance with an example implementation of the present disclosure.
Figure 13:
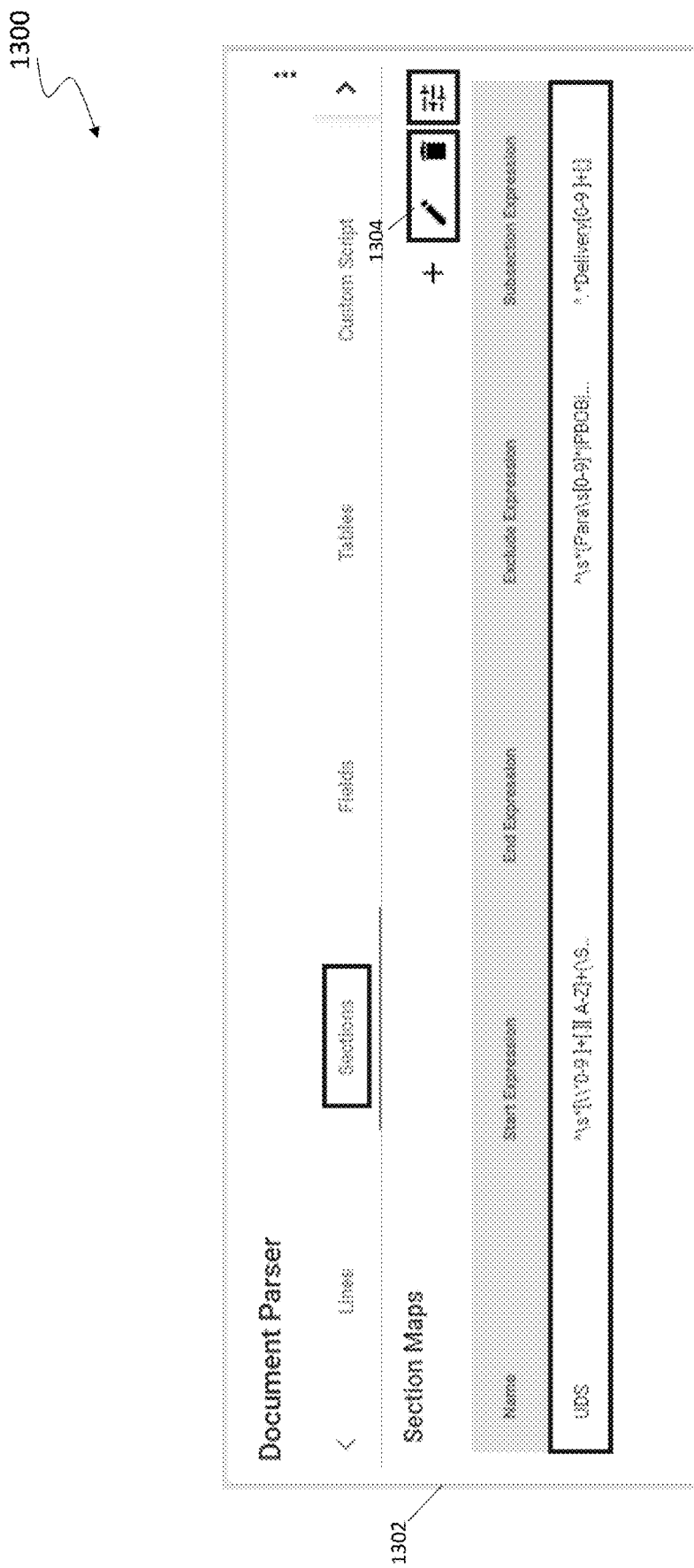
FIG. 13 illustrates an example display screen including a section maps section providing selectable options for mapped sections of a document, in accordance with an example implementation of the present disclosure.

FIG. 12 illustrates an example display screen 1200 that includes file selection section 1202, document viewer section 1204, and document parser section 1206. As shown in FIG. 12, the document has been broken into many small sections based on the expressions previously defined (FIG. 11), and sections are displayed with corresponding section header. As a user selects a respective section in 1204, the corresponding text in section 1206 can become highlighted. FIG. 13 illustrates an example display screen 1300 in which section maps section 1302 provides selectable options for mapped sections for a document. Existing sections can be displayed in a grid view and edited via Edit/Delete options 1304. Once a document has been broken into smaller sections, each section can be mapped and, thereafter, processed through a corresponding NLP model. Thereafter, respective options can be provided via the present disclosure, such as to select respective sections and corresponding model names for further processing (e.g., editing or deleting).

Figure 14:
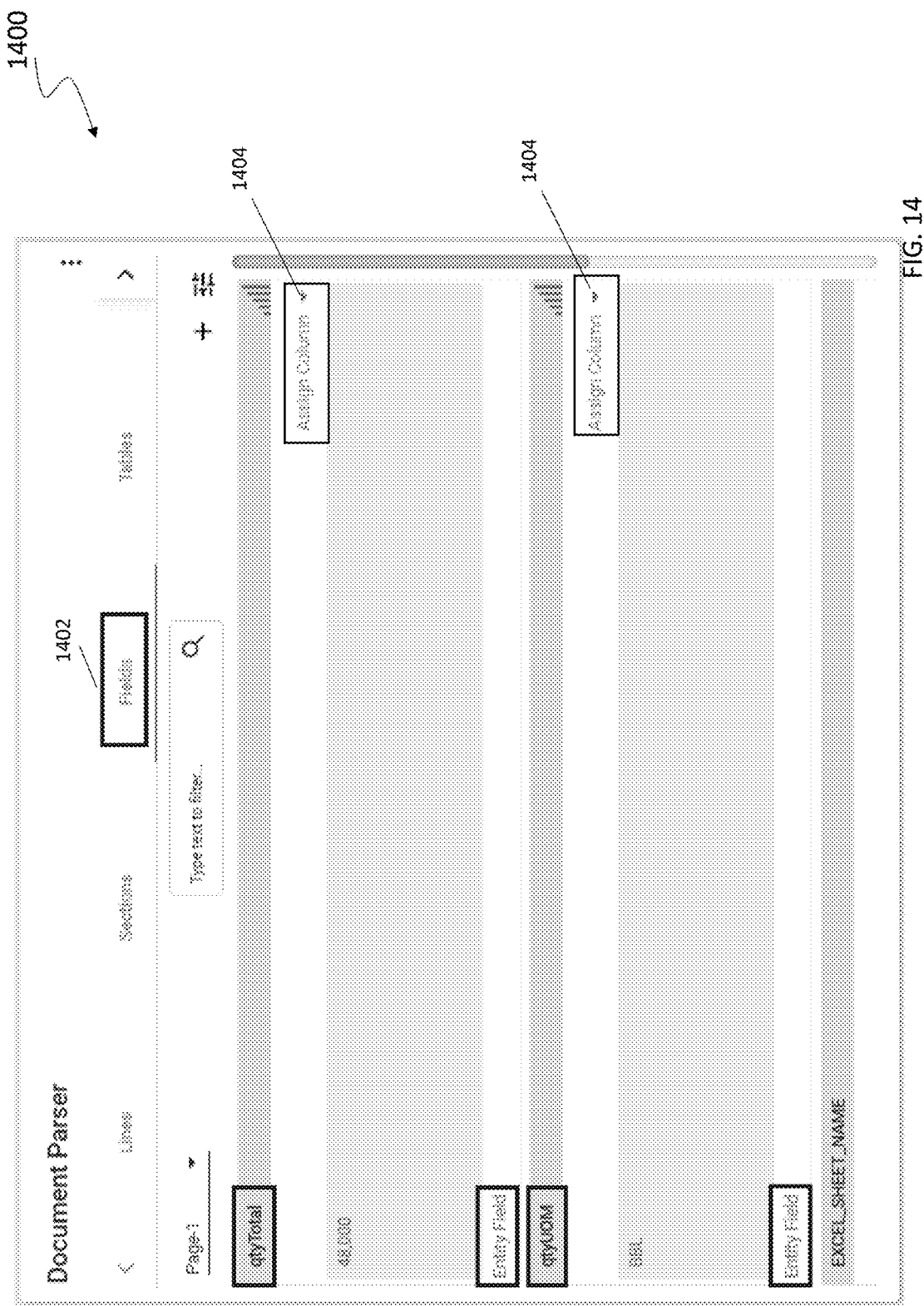
FIG. 14 illustrates an example document parser display screen, in accordance with an example implementation of the present disclosure.

FIG. 14 illustrates an example document parser display screen 1400 in accordance with an example implementation of the present disclosure. As illustrated in display screen 1400, Fields tab 1402 is provided that, when selected, displays mapped fields and corresponding values. The mapped fields shown in display screen 1400 are available to be assigned in a respective schema column, for example via assign column drop down control 1404.

In one or more implementations of the present disclosure, an option can be provided to hide one or more tabs, such as Sections tab. After a user selects an option to define no segmentations, the Sections tab option can be hidden from view. Users can be prompted, for example, to delete previously defined sections, and can also add sections (such as shown and described herein), to toggle the Sections tag back on. Thus, the graphical user interface provided in accordance with the present disclosure supports customization both in appearance and functionality.

Figure 15:
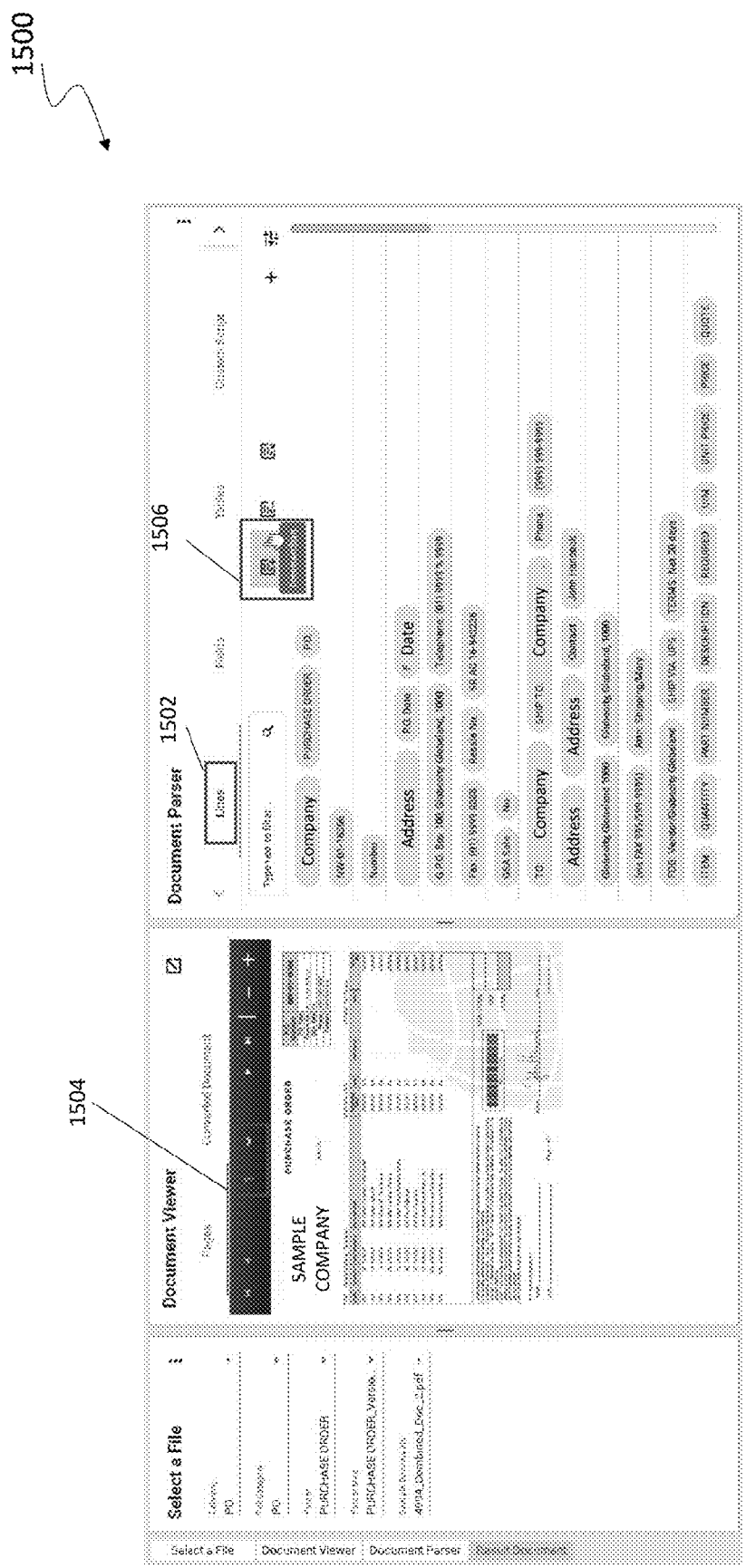
FIG. 15 illustrates an example display screen that is provided in accordance with an example implementation of the present disclosure associated with automatic classification and splitting.

As noted herein, the present disclosure supports document processing as a function of automatic classification or automatic splitting functionality. An appropriate parser configured with a converter type, such as AWS Textract or Doc A/I, as shown and described herein. Thereafter, the sample document can be uploaded into the targeted parser. FIG. 15 illustrates an example display screen 1500 that is provided in accordance with an example implementation of the present disclosure associated with automatic classification. As illustrated in FIG. 15, lines tab 1502 can, when selected, provides display screen 1500 and options for defining start pages. Each first page of a multi-part document can be identified to represent the start of document, including via page number control 1504 and documents control icon 1506. Each first page of the document can be identified as the document start in the lines tab, and the example shown in FIG. 15 contains both a purchase order and invoice documents types, and each document type can include three documents. For example, pages 1, 3 & 5 are purchase order documents and pages 2, 4 & 6 are invoice documents. At the time of onboarding, the documents are accordingly defined. Once appropriate pages are now selected as Document Start, the respective pages are identified as Document Start apply for the purchase order documents and the invoice documents.

Figure 16:
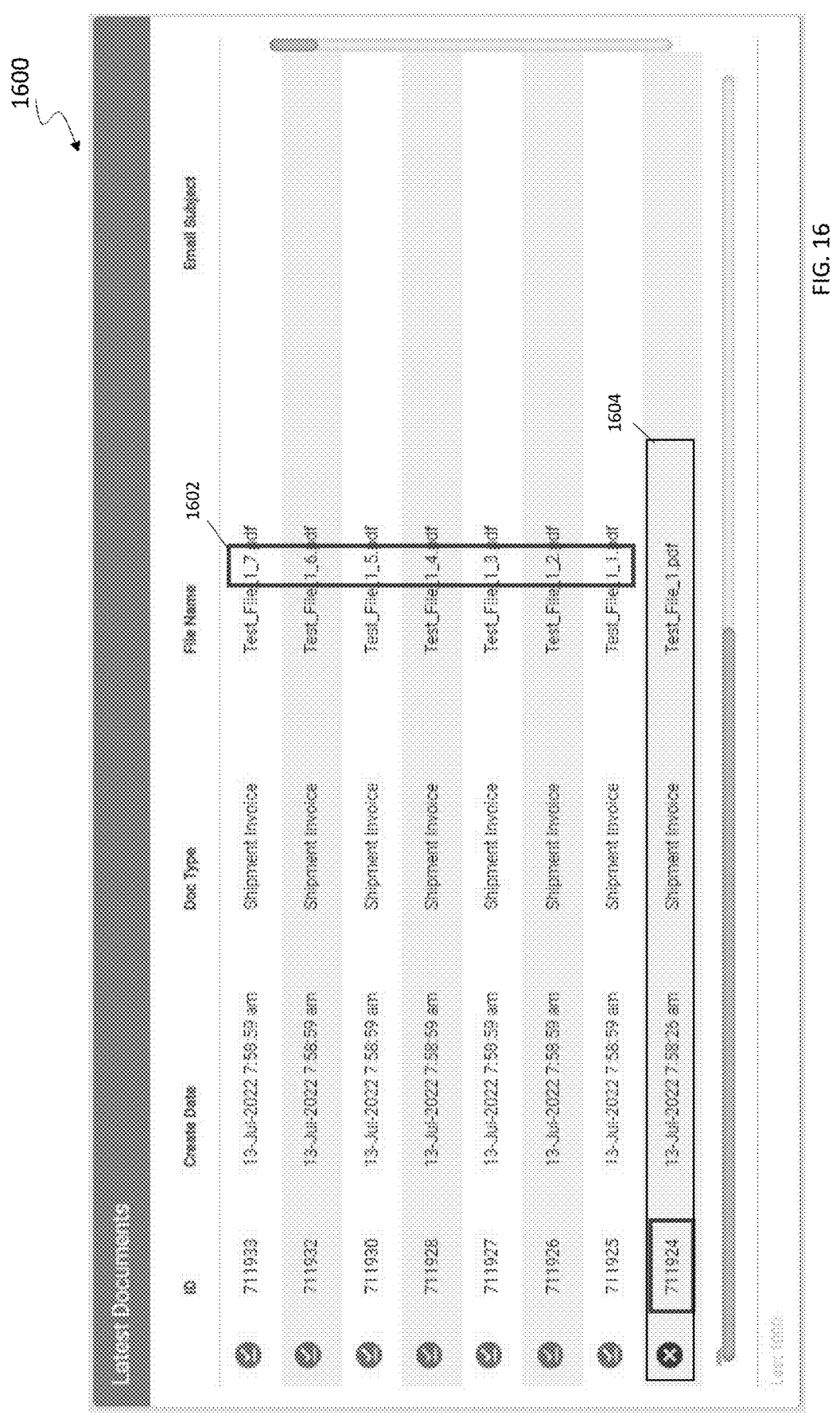

Moreover and with regard to automatic splitting. FIG. 16 illustrates an example display screen 1600 that is provided in connection with segmentation in accordance with an example implementation of the present disclosure. As shown in FIG. 16, files highlighted in section 1602 have successfully been segmented from a multi-part document. The document shown in highlight section 1604 was not properly identified. Document identification may fail, for example, in the event that a document (or portion) was not properly classified and, hence, not recognized. The present disclosure provides for options to assign one or more documents correctly for a respective document type (e.g., purchase order or invoice). For example, a display screen associated with a parser can be provided and the user can select via control 1502 the page number. Thereafter, a parsing process can run and the document identification process completed.

As noted herein, an anchor term can be included in one or more implementations as an additional feature to identify the page as start/end page where the document start/document end feature is not sufficient alone for identification. For example, where a document template is similar and used by multiple customers, documents can be differentiated by using an Anchor term. Any field which has different value/text in the document for each customer can be defined as an anchor term.

Accordingly, and as represented in the example implementation shown and described herein, documents can be processed to extract data, such as by breaking down the invoice to fields and tables automatically. The present disclosure provides technological improvements, including for improving the functioning of computing devices, including for classifying, segmenting, and parsing documents, and by enriching data associated there using machine learning/artificial intelligence systems. Such processing can include submitting or resubmitting documents to engage in training or re-training processes, which are computationally demanding and involve specialized skills required of computer programmers an artificial intelligence developer. The features shown and described herein leverage an ability to customize machine learning/artificial intelligence to locate data that otherwise could not be found.

While operations shown and described herein may be in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this disclosure, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having." "containing," "involving," and variations thereof herein, is meant to encompass the items listed thereafter and equivalents thereof as well as additional items.

Particular embodiments of the subject matter described in this disclosure have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing can be advantageous.

What is claimed is:

1. A document transformation and processing method, comprising:
   presenting, by at least one processor, an interactive graphical user interface that includes:
      a file section that includes a plurality of respective options for selecting from a plurality of parsing pipelines and for selecting from a plurality of electronic files;
      a document viewing section that displays an electronic file corresponding to a selection made in the file section; and
      a parser section that displays at least some textual content of an electronic file corresponding to a selection made in the file section, wherein the parser section includes a plurality of tabs that, when selected, respectively provide options for defining start pages in a multi-part document included in an electronic file corresponding to a selection made in the file section, for mapping fields within an electronic file corresponding to a selection made in the file section, and for extracting sections within an electronic file corresponding to a selection made in the file section;

receiving, by the at least one processor via the graphical user interface in the file section, a selection of a parsing pipeline of the plurality of parsing pipelines (a "selected parsing pipeline") and a selection of an electronic file of the plurality of electronic files (a "selected electronic file");

accessing, by at least one processor, the selected electronic file in a first format;

processing, by the at least one processor, the selected electronic file to convert the selected electronic file to a second format;

accessing, by the at least one processor referencing information in at least one database, the selected parsing pipeline, including processing instructions for one or more of content extraction, entity recognition, and schema mapping;

applying, by the at least one processor, the selected parsing pipeline to at least some content in the selected electronic file;

extracting, by the at least one processor, the at least some content in the selected electronic file;

applying, by the at least one processor, entity recognition on the selected extracted content and generating output in response to the entity recognition;

mapping, by the at least one processor, the output to a respective one of a plurality of schemas;

presenting, by the at least one processor, in the interactive graphical user interface:
  the selections received in the file section representing at least the selected parsing pipeline and the selected electronic file;
  the selected electronic file in the document viewing section; and
  at least some textual content of the selected electronic file in the parser section; and in response to a user selection of at least some of the content of the selected electronic file displayed in the document viewing section, the at least one processor highlights corresponding mapped output displayed in the parser section and corresponding to, the respective one of the plurality of schemas.

2. The method of claim 1, wherein selecting, by the at least one processor, the respective one of a plurality of parsing pipelines is in accordance with metadata provided with the electronic file, content in the electronic file associated with a respective parsing pipeline, or entity recognition.

3. The method of claim 1, further comprising identifying the content by:
  recognizing, by the at least one processor, at least one anchor term included in the electronic file.

4. The method of claim 1, further comprising:
  identifying, by the at least one processor, a plurality of documents in the electronic file; and
  splitting, by the at least one processor, the electronic file into the plurality of documents.

5. The method of claim 4, further comprising:
  segmenting, by the at least one processor, at least one of the plurality of documents into at least one of a section group, a section, and a subsection,
  wherein applying, by the at least one processor, entity recognition on the extracted content includes applying entity recognition on the at least one of the section group, the section, and the subsection.

6. The method of claim 1, further comprising:
  invoking, by the at least one processor, initial extraction on at least some content in the electronic file; and
  invoking, by the at least one processor, further extraction on the at least some content in the electronic file,
  wherein the initial extraction and the further extraction are performed in advance of applying, by the at least one processor, the respective one of the plurality parsing pipelines.

7. The method of claim 1, further comprising:
  providing, by the at least one processor in response to a selection of a respective tab, options for configuring sections within the selected electronic file.

8. The method of claim 7, wherein the options for configuring sections include:
  a section name;
  a start expression;
  an end expression; and
  a subsequent expression.

9. The method of claim 7, further comprising:
  displaying, by the at least one processor in the interactive graphical user interface, information representing:
    respective section identifiers;
    respective section creation dates;
    type of the selected electronic file; and
    file names, each of the file names representing the selected electronic file, the total number of sections and the corresponding section of the total number of sections.

10. The method of claim 1, further comprising:
  providing, by the at least one processor in response to a selection of a respective tab, options for defining mapped fields within the selected electronic file.

11. The method of claim 10, wherein the options for defining mapped fields include:
  field labels; and
  columns.

12. A document transformation and processing system, comprising:
  at least one computing device, configured to access instructions stored on non-transitory processor readable media that, when executed by the at least one computing device, configure the at least one computing device to:
    access an electronic file provided in a first format;
    process the electronic file to convert the electronic file to a second format;
    select, by referencing information in at least one database associated with at least some content in the electronic file, a respective one of a plurality of parsing pipelines,
    wherein each of the parsing pipelines includes processing instructions for one or more of content extraction, entity recognition, and schema mapping;
    apply the respective one of the plurality of parsing pipelines to the at least some content in the electronic file by:
      extracting content in the electronic file;
      applying entity recognition on the extracted content;
      receiving, in response to the entity recognition, output;
      mapping the output to a respective one of a plurality of schemas;
    present, by the at least one processor, in an interactive graphical user interface:
      selections received in a file section configured with the interactive graphical user interface representing at least the respective one of the plurality of parsing pipelines and the electronic file;

the electronic file displayed in a document viewing section configured with the interactive graphical user interface; and at least some textual content of the selected electronic file in a parser section configured with the graphical user interface; and in response to a user selection of at least some of the content of the electronic file displayed in the document viewing section, highlight corresponding mapped output displayed in the parser section and corresponding to the respective one of the plurality of schemas.

13. The system of claim 12, wherein the at least one computing device is further configured to select the respective one of a plurality of parsing pipelines in accordance with metadata provided with the electronic file, content in the electronic file associated with a respective parsing pipeline, or entity recognition.

14. The system of claim 12, wherein the at least one computing device is further configured to:

recognize at least one anchor term included in the electronic file.

15. The system of claim 12, wherein the at least one computing device is further configured to:

identify a plurality of documents in the electronic file; and
split the electronic file into the plurality of documents.

16. The system of claim 15, wherein the at least one computing device is further configured to:

segment at least one of the plurality of documents into at least one of a section group, a section, and a subsection, wherein the at least one computing device is further configured to apply entity recognition on the extracted content by applying entity recognition on the at least one of the section group, the section, and the subsection.

17. The system of claim 12, wherein the at least one computing device is further configured to:

invoke initial extraction on at least some content in the electronic file; and invoke further extraction on the at least some content in the electronic file, wherein the initial extraction and the further extraction are performed in advance of applying, by the at least one processor, the respective one of the plurality parsing pipelines.

18. The system of claim 12, wherein the at least one computing device is further configured to provide, in response to a selection of a respective tab, options for configuring sections within the selected electronic file.

19. The system of claim 18, wherein the options for configuring sections include:

a section name;
a start expression;
an end expression; and
a subsequent expression.

20. The system of claim 18, wherein the at least one computing device is further configured to display, in the interactive graphical user interface, information representing:

respective section identifiers;
respective section creation dates;
type of the selected electronic file; and
file names, each of the file names representing the selected electronic file, the total number of sections and the corresponding section of the total number of sections.

* * * * *